(12) United States Patent
Park et al.

(10) Patent No.: US 11,050,829 B2
(45) Date of Patent: Jun. 29, 2021

(54) METHOD FOR SHARING INFORMATION ON CONDITIONAL ACTION AND ELECTRONIC DEVICE THEREFOR

(71) Applicant: Samsung Electronics Co., Ltd., Suwon-si (KR)

(72) Inventors: Gun Park, Suwon-si (KR); Wonsuck Lee, Seongnam-si (KR); Aeyoung Lee, Seongnam-si (KR); Jungki Hong, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 45 days.

(21) Appl. No.: 16/465,972

(22) PCT Filed: Nov. 8, 2017

(86) PCT No.: PCT/KR2017/012569
§ 371 (c)(1),
(2) Date: May 31, 2019

(87) PCT Pub. No.: WO2018/101628
PCT Pub. Date: Jun. 7, 2018

(65) Prior Publication Data
US 2019/0306247 A1 Oct. 3, 2019

(30) Foreign Application Priority Data

Dec. 1, 2016 (KR) .................. 10-2016-0162767

(51) Int. Cl.
*H04L 29/08* (2006.01)
*H04L 12/24* (2006.01)
*G06F 3/01* (2006.01)

(52) U.S. Cl.
CPC .............. *H04L 67/125* (2013.01); *G06F 3/01* (2013.01); *H04L 29/08* (2013.01); *H04L 41/08* (2013.01);
(Continued)

(58) Field of Classification Search
CPC ..... H04L 41/00; H04L 41/08; H04L 41/0803; H04L 67/00; H04L 67/04; H04L 67/12; H04L 67/125; H04L 67/30–306
See application file for complete search history.

(56) References Cited

U.S. PATENT DOCUMENTS 7,607,164 B2 * 10/2009 Vasishth ............... G06F 21/577
726/1
7,681,035 B1 * 3/2010 Ayars ............. H04N 21/234336
713/165

(Continued)

FOREIGN PATENT DOCUMENTS

JP         2016527779 A    9/2016
KR    10-2012-0090612 A    8/2012
(Continued)

OTHER PUBLICATIONS

ISA/KR, "International Search Report and Written Opinion of the International Searching Authority," International Application No. PCT/KR2017/012569, dated Feb. 23, 2018, 11 pages.

*Primary Examiner* — Boris D Grijalva Lobos

(57) ABSTRACT

The disclosure relates to sharing of information regarding a conditional action in an electronic device. The device includes a communication module for processing a signal for communication with other devices, and a processor. Herein, the at least one processor receives a ruleset including information regarding at least one conditional action from another electronic device via the communication module, and executes the ruleset. The ruleset may include at least one (Continued)

ruleset of which a permission for at least one of reading, modification, and deletion is limited.

18 Claims, 26 Drawing Sheets

(52) U.S. Cl.
CPC .......... *H04L 41/0803* (2013.01); *H04L 67/12* (2013.01); *H04L 67/303* (2013.01)

(56) References Cited

U.S. PATENT DOCUMENTS

| | | | | |
|---|---|---|---|---|
| 8,640,099 | B1* | 1/2014 | McGilliard | G06Q 30/0603 |
| | | | | 717/121 |
| 8,769,610 | B1* | 7/2014 | Giguiere | H04L 63/102 |
| | | | | 726/1 |
| 9,986,013 | B2* | 5/2018 | Thomas | G06F 16/1727 |
| 10,110,635 | B1* | 10/2018 | Hussain | G06F 21/53 |
| 10,122,757 | B1* | 11/2018 | Kruse | H04L 63/10 |
| 10,142,310 | B2* | 11/2018 | Oh | G07C 9/00571 |
| 10,296,744 | B1* | 5/2019 | McGrew | G06F 21/554 |
| 10,353,359 | B1* | 7/2019 | Jordan, II | G06Q 40/08 |
| 10,432,707 | B2* | 10/2019 | Hosie | H04L 67/1008 |
| 2001/0025311 | A1* | 9/2001 | Arai | H04L 63/101 |
| | | | | 709/225 |
| 2006/0136369 | A1* | 6/2006 | Douceur | G06F 16/182 |
| 2006/0150238 | A1* | 7/2006 | D'Agostino | H04L 63/20 |
| | | | | 726/1 |
| 2007/0100859 | A1* | 5/2007 | Holmes | G06Q 10/06 |
| 2007/0156659 | A1* | 7/2007 | Lim | H04L 41/0893 |
| 2007/0156897 | A1* | 7/2007 | Lim | H04L 63/20 |
| | | | | 709/225 |
| 2007/0162749 | A1* | 7/2007 | Lim | G06F 21/6227 |
| | | | | 713/167 |
| 2007/0168047 | A1* | 7/2007 | Cromer | G11B 19/04 |
| | | | | 700/1 |
| 2008/0060080 | A1* | 3/2008 | Lim | H04L 63/107 |
| | | | | 726/26 |
| 2008/0120383 | A1* | 5/2008 | Kumar | G06Q 10/107 |
| | | | | 709/206 |
| 2009/0158384 | A1* | 6/2009 | Kanade | G06F 21/604 |
| | | | | 726/1 |
| 2009/0320088 | A1* | 12/2009 | Gill | G06Q 10/00 |
| | | | | 726/1 |
| 2009/0325615 | A1 | 12/2009 | McKay et al. | |
| 2013/0267198 | A1 | 10/2013 | Debenedictis et al. | |
| 2013/0290432 | A1 | 10/2013 | Oh et al. | |
| 2014/0372771 | A1* | 12/2014 | Chuang | H04L 63/0428 |
| | | | | 713/190 |
| 2016/0087854 | A1* | 3/2016 | Jayanti Venkata | H04L 67/306 |
| | | | | 709/224 |
| 2016/0124404 | A1 | 5/2016 | Oh et al. | |
| 2016/0156604 | A1* | 6/2016 | Oh | G07C 9/00571 |
| | | | | 726/4 |
| 2016/0170390 | A1 | 6/2016 | Xie et al. | |
| 2016/0337291 | A1 | 11/2016 | Park et al. | |
| 2016/0344593 | A1 | 11/2016 | Ha et al. | |
| 2016/0371905 | A1 | 12/2016 | Borg et al. | |

FOREIGN PATENT DOCUMENTS

| | | |
|---|---|---|
| KR | 10-2016-0053676 A | 5/2016 |
| KR | 10-2016-0073299 A | 6/2016 |
| KR | 10-2016-0134427 A | 11/2016 |
| KR | 10-2016-0137254 A | 11/2016 |

* cited by examiner

| EXERCISE | |
|---|---|
| EXERCISE 1 | 3 SETS |
| BREAK | 1 MINUTE |
| EXERCISE 2 | 3 SETS |
| BREAK | 1 MINUTE |
| LEG EXTENSION 10 TIMES | 3SET |
| RUNNING MACHINE | 6Km |

1410

| DIET FOR DAY 1 | |
|---|---|
| CHICKEN BREAST | 200g |
| TOMATO POWER JUICE | 300g |

METHOD FOR SHARING INFORMATION ON CONDITIONAL ACTION AND ELECTRONIC DEVICE THEREFOR

CROSS-REFERENCE TO RELATED APPLICATIONS

This application is a 371 National Stage of International Application No. PCT/KR2017/012569, filed Nov. 8, 2017, which claims priority to Korean Patent Application No. 10-2016-0162767, filed Dec. 1, 2016, the disclosures of which are herein incorporated by reference in their entirety.

BACKGROUND

1. Field

Various embodiments of the disclosure relate to a method for sharing information for a conditional action, and an electronic device thereof.

2. Description of Related Art

With the gradual performance increase in a portable electronic device such as a smart phone, various services are being provided through the electronic device. Specifically, in addition to a basic service such as phone calls, text messaging, or the like, a service area is expanding to more complex services such as games, messengers, document editing, image/video playback and editing, or the like.

Further, in addition to services defined by designers of electronic devices and applications, there is a service being developed to provide functions defined by users. For example, a service in which a specific function or operation is executed conditionally is presented by giving a specific condition to a function provided in the electronic device.

SUMMARY

Various embodiments of the disclosure provide a method for providing information regarding a more improved conditional action, and an electronic device thereof.

Various embodiments of the disclosure provide a method for providing information regarding conditional actions defined consecutively, and an electronic device thereof.

Various embodiments of the disclosure provide a method for protecting creator's rights for a conditional action, and an electronic device thereof.

Various embodiments of the disclosure provide a method for improving an advertising effect for a conditional action, and an electronic device thereof.

Various embodiments of the disclosure provide a method for sharing information regarding a conditional action having a limited permission, and an electronic device thereof.

Various embodiments of the disclosure provide a method for generating a ruleset including a conditional action having a limited permission, and an electronic device thereof.

Various embodiments of the disclosure provide a method for changing a permission for a conditional action, and an electronic device thereof.

Various embodiments of the disclosure provide a method for executing a conditional action associated with a plurality of devices, and an electronic device thereof.

According to various embodiments of the disclosure, an electronic device includes a communication module for processing a signal for communication with other devices, and a processor. Herein, the at least one processor receives a ruleset including information regarding at least one conditional action from another electronic device via the communication module, and executes the ruleset. The ruleset may include at least one ruleset of which a permission for at least one of reading, modification, and deletion is limited.

According to various embodiments of the disclosure, an electronic device includes a communication module for processing a signal for communication with other devices, and a processor. Herein, the at least one processor transmits a ruleset including information regarding at least one conditional action via the communication module. The ruleset may include at least one ruleset of which a permission for at least one of reading, modification, and deletion is limited.

According to various embodiments of the disclosure, a method of operating an electronic device includes transmitting a request for a ruleset including information regarding at least one conditional action, receiving the ruleset, and executing the ruleset. The ruleset may include at least one ruleset of which a permission for at least one of reading, modification, and deletion is limited.

A method and electronic device thereof according to various embodiments can share and execute a ruleset including at least one action or ruleset having a limited permission for at least one of reading, modification, and deletion, thereby protecting creator's rights and providing an advertising effect.

BRIEF DESCRIPTION OF THE DRAWINGS

FIG. 14B illustrates an example of rulesets associated with a user's act according to various embodiments of the disclosure;

DETAILED DESCRIPTION

Figure 1:
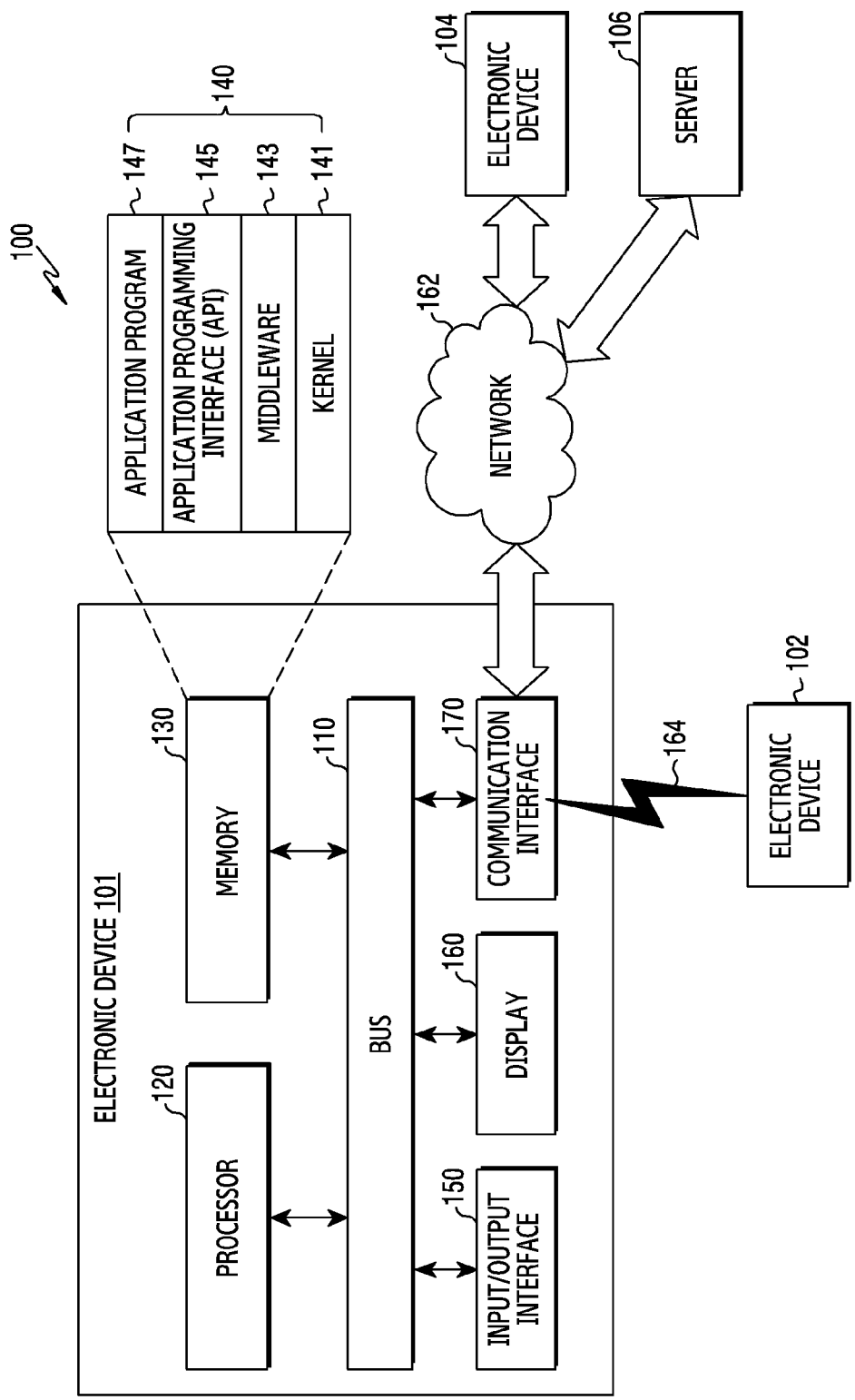
FIG. 1 illustrates an electronic device in a network environment according to various embodiments of the disclosure.

Hereinafter, various example embodiments of the present disclosure will be described with reference to the accompanying drawings. Embodiments and terms used to describe the embodiments should be understood that there is no intent to limit the present disclosure to the particular forms disclosed herein; rather, the present disclosure should be understood to cover various modifications, equivalents, and/or alternatives of embodiments of the embodiments. In describing the drawings, similar reference numerals may be used to designate similar constituent elements. The singular expression may include plural expressions, unless the context clearly dictates otherwise. In the present disclosure, the expression "A or B", "at least one of A or/and B", or "one or more of A or/and B" may include all possible combinations of the items listed. The expression "a first", "a second", "the first", or "the second" used in various embodiments of the present disclosure may modify various components regardless of the order and/or the importance but does not limit the corresponding components. It should be understood that when an element (e.g., first element) is referred to as being (operatively or communicatively) "connected," or "coupled," to another element (e.g., second element), it may be directly connected or coupled directly to the other element or any other element (e.g., third element) may be interposed between them. In contrast, it may be understood that when an element (e.g., first element) is referred to as being "directly connected," or "directly coupled" to another element (second element), there are no element (e.g., third element) interposed between them.

The expression "configured to" used in the present disclosure may be used interchangeably with, for example, "suitable for", "having the capacity to", "designed to", "adapted to", "made to", or "capable of" hardware or software according to the situation. In some situations, the expression "device configured to" may refer to a situation in which that the device, together with other devices or components, "is able to". For example, the phrase "processor adapted (or configured) to perform A, B, and C" may refer, for example, to a dedicated processor (e.g. embedded processor) only for performing the corresponding operations or a generic-purpose processor (e.g., central processing unit (CPU) or application processor (AP)) that can perform the corresponding operations by executing one or more software programs stored in a memory device.

An electronic device according to various example embodiments of the present disclosure may include at least one of, for example, a smart phone, a tablet Personal Computer (PC), a mobile phone, a video phone, an electronic book reader (e-book reader), a desktop PC, a laptop PC, a netbook computer, a workstation, a server, a Personal Digital Assistant (PDA), a Portable Multimedia Player (PMP), a MPEG-1 audio layer-3 (MP3) player, a mobile medical device, a camera, and a wearable device, or the like, but is not limited thereto. According to various example embodiments, the wearable device may include at least one of an accessory type (e.g., a watch, a ring, a bracelet, an anklet, a necklace, a glasses, a contact lens, or a Head-Mounted Device (HMD)), a fabric or clothing integrated type (e.g., an electronic clothing), a body-mounted type (e.g., a skin pad, or tattoo), and a bio-implantable type (e.g., an implantable circuit), or the like, but is not limited thereto. According to some example embodiments, the electronic device may be a home appliance. The home appliance may include at least one of, for example, a television, a Digital Video Disk (DVD) player, an audio, a refrigerator, an air conditioner, a vacuum cleaner, an oven, a microwave oven, a washing machine, an air cleaner, a set-top box, a home automation control panel, a security control panel, a TV box (e.g., Samsung HomeSync™, Apple TV™, or Google TV™), a game console (e.g., Xbox™ and PlayStation™), an electronic dictionary, an electronic key, a camcorder, and an electronic photo frame, or the like, but is not limited thereto.

According to another example embodiment, the electronic device may include at least one of various medical devices (e.g., various portable medical measuring devices (a blood glucose monitoring device, a heart rate monitoring device, a blood pressure measuring device, a body temperature measuring device, etc.), a Magnetic Resonance Angiography (MRA), a Magnetic Resonance Imaging (MRI), a Computed Tomography (CT) machine, and an ultrasonic machine), a navigation device, a Global Positioning System (GPS) receiver, an Event Data Recorder (EDR), a Flight Data Recorder (FDR), a Vehicle Infotainment Devices, an electronic devices for a ship (e.g., a navigation device for a ship, and a gyro-compass), avionics, security devices, an automotive head unit, a robot for home or industry, an automatic teller's machine (ATM) in banks, point of sales (POS) in a shop, or internet device of things (e.g., a light bulb, various sensors, electric or gas meter, a sprinkler device, a fire alarm, a thermostat, a streetlamp, a toaster, a sporting goods, a hot water tank, a heater, a boiler, etc.), or the like, but is not limited thereto. According to some example embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter), or the like, but is not limited thereto. The electronic device according to various example embodiments of the present disclosure may be a combination of one or more of the aforementioned various devices. The electronic device according to some embodiments of the present disclosure may be a flexible device. Further, the electronic device according to an example embodiment of the present disclosure is not limited to the aforementioned devices, and may include a new electronic device (e.g., an artificial intelligence electronic device) according to the development of technology.

An electronic device 101 within a network environment 100, according to various embodiments, will be described with reference to FIG. 1. The electronic device 101 may include a bus 110, a processor (e.g., including processing circuitry) 120, a memory 130, an input/output interface (e.g., including input/output circuitry) 150, a display 160, and a communication interface (e.g., including communication circuitry) 170. According to an example embodiment of the present disclosure, the electronic device 101 may omit at least one of the above components or may further include other components. The bus 110 may include, for example, a circuit which interconnects the components 110 to 170 and delivers a communication (e.g., a control message and/or data) between the components 110 to 170. The processor 120 may include various processing circuitry, such as, for example, and without limitation, one or more of a dedicated processor, a Central Processing Unit (CPU), an Application Processor (AP), and a Communication Processor (CP). The processor 120 may carry out, for example, calculation or data processing relating to control and/or communication of at least one other component of the electronic device 101.

The memory 130 may include a volatile memory and/or a non-volatile memory. The memory 130 may store, for example, commands or data relevant to at least one other component of the electronic device 101. According to an embodiment of the present disclosure, the memory 130 may store software and/or a program 140. The program 140 may include, for example, a kernel 141, middleware 143, an Application Programming Interface (API) 145, and/or application programs (or "applications") 147. At least some of the kernel 141, the middleware 143, and the API 145 may be referred to as an Operating System (OS). The kernel 141 may control or manage system resources (e.g., the bus 110, the processor 120, or the memory 130) used for performing an operation or function implemented in the other programs (e.g., the middleware 143, the API 145, or the application programs 147). Furthermore, the kernel 141 may provide an interface through which the middleware 143, the API 145, or the application programs 147 may access the individual components of the electronic device 101 to control or manage the system resources.

The middleware 143, for example, may serve as an intermediary for allowing the API 145 or the application programs 147 to communicate with the kernel 141 to exchange data. Also, the middleware 143 may process one or more task requests received from the application programs 147 according to priorities thereof. For example, the middleware 143 may assign priorities for using the system resources (e.g., the bus 110, the processor 120, the memory 130, or the like) of the electronic device 101, to at least one of the application programs 147 and may perform the one or more task requests. The API 145 is an interface through which the applications 147 control functions provided from the kernel 141 or the middleware 143, and may include, for example, at least one interface or function (e.g., instruction) for file control, window control, image processing, character control, and the like. The input/output interface 150, for example, may transfer commands or data input from a user or another external device to the other element(s) of the electronic device 101. Furthermore, the input/output interface 150 may output the commands or data received from the other element(s) of the electronic device 101 to the user or another external device.

Examples of the display 160 may include a Liquid Crystal Display (LCD), a Light-Emitting Diode (LED) display, an Organic Light-Emitting Diode (OLED) display, a MicroElectroMechanical Systems (MEMS) display, and an electronic paper display, or the like, but is not limited thereto. The display 160 may display, for example, various types of contents (e.g., text, images, videos, icons, or symbols) to users. The display 160 may include a touch screen, and may receive, for example, a touch, gesture, proximity, or hovering input using an electronic pen or a user's body part. The communication interface 170 may include various communication circuitry and may establish communication, for example, between the electronic device 101 and an external device (e.g., a first external electronic device 102, a second external electronic device 104, or a server 106). For example, the communication interface 170 may be connected to a network 162 through wireless or wired communication, and may communicate with an external device (e.g., the second external electronic device 104 or the server 106). According to one embodiment of the disclosure, the server 106 may refer to the electronic device.

The wireless communication may include a cellular communication protocol using at least one of, for example, Long Term Evolution (LTE), LTE-Advance (LTE-A), Code Division Multiple Access (CDMA), Wideband CDMA (WCDMA), Universal Mobile Telecommunications System (UMTS), Wireless Broadband (WiBro), and Global System for Mobile Communications (GSM). According to one embodiment of the disclosure, the wireless communication may include at least one of, for example, Wi-Fi, Bluetooth, Bluetooth Low Energy (BLE), Near Field Communication (NFC), Magnetic Secure Transmission, Radio Frequency and Body Area Network (BAN). According to one embodiment of the disclosure, the wireless communication may include Global Navigation Satellite System (GNSS). GNSS may include, for example, at least one of global positioning system (GPS), global navigation satellite system (Glonass), Beidou Navigation satellite system (Beidou) or Galileo, and the European global satellite-based navigation system. Hereinafter, in the present disclosure, the "GPS" may be interchangeably used with the "GNSS". The wired communication may include, for example, at least one of a Universal Serial Bus (USB), a High Definition Multimedia Interface (HDMI), Recommended Standard 232 (RS-232), power wire communication, and a Plain Old Telephone Service (POTS). The network 162 may include at least one of a telecommunication network such as a computer network (e.g., a LAN or a WAN), the Internet, and a telephone network.

Each of the first and second external electronic devices 102 and 104 may be of a type identical to or different from that of the electronic device 101. According to various example embodiments of the present disclosure, all or some of the operations performed in the electronic device 101 may be executed in another electronic device or a plurality of electronic devices (e.g., the electronic devices 102 and 104 or the server 106). According to an embodiment of the present disclosure, when the electronic device 101 has to perform some functions or services automatically or in response to a request, the electronic device 101 may request another device (e.g., the electronic device 102 or 104 or the server 106) to execute at least some functions relating thereto instead of or in addition to autonomously performing the functions or services. Another electronic device (e.g., the electronic device 102 or 104, or the server 106) may execute the requested functions or the additional functions, and may deliver a result of the execution to the electronic device 101. The electronic device 101 may process the received result as it is or additionally, and may provide the requested functions or services. To this end, for example, cloud computing, distributed computing, or client-server computing technologies may be used.

The server 106, according to an embodiment, may be an entity which manages information regarding conditional actions. For example, the server 106 may store information regarding the conditional actions and provide upload and download services. For example, the server 106 may provide various functions such as uploading, sharing, downloading, editing, expiration date management, permission cancellation request, permission cancellation verification, permission cancellation approval or rejection, or the like for the information regarding the conditional actions. In addition, the electronic device 102 may also be a device for which an Internet connection is possible through a network, such as a mobile device, a Personal Computer (PC), an Internet of Things (IoT) device. Further, the electronic device 102 may have access to the server 106 through a site or application and write and edit a ruleset which uses consecutive actions and triggers according to various embodiments.

Figure 2:
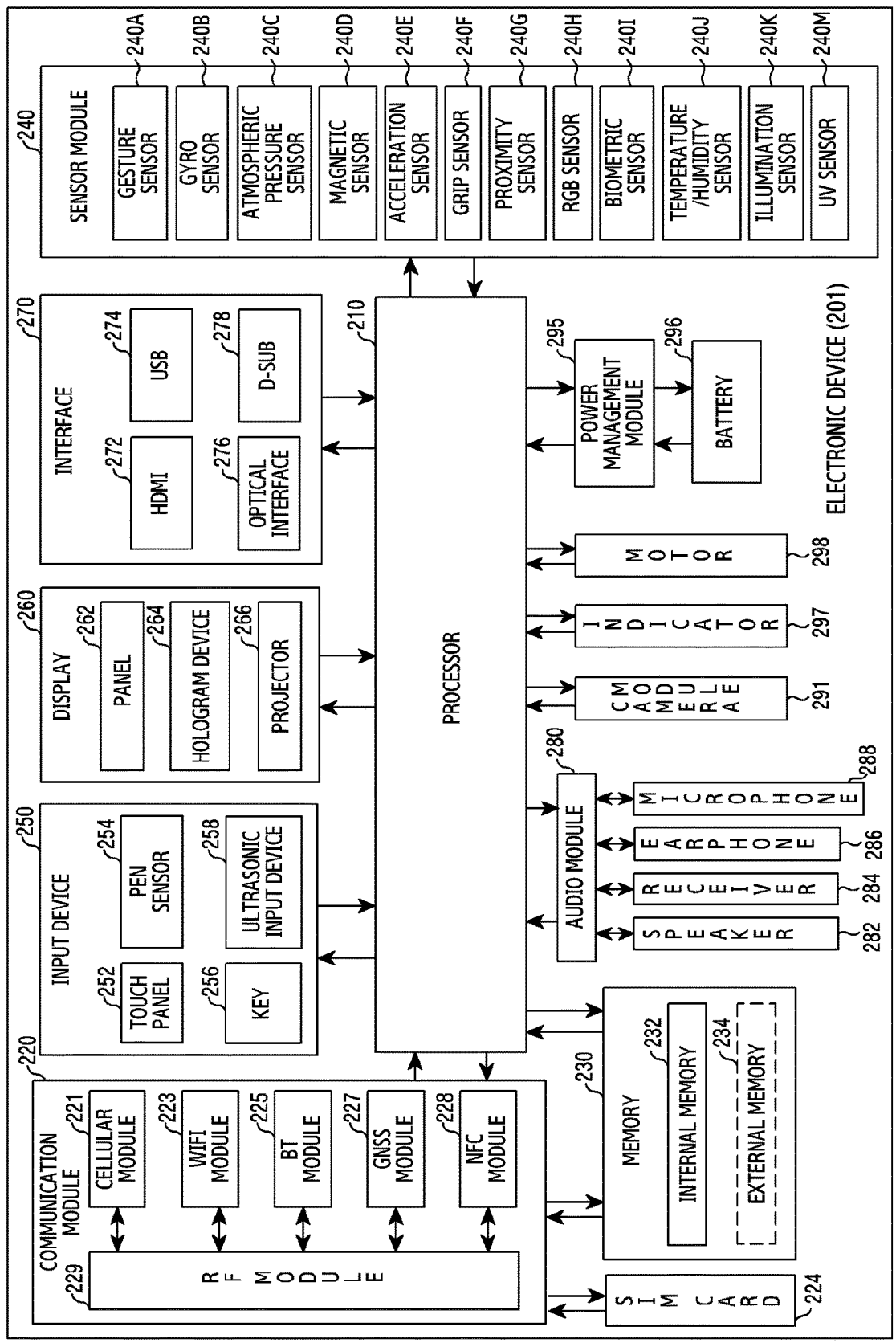
FIG. 2 illustrates a block diagram of an electronic device according to various embodiments of the disclosure.

FIG. 2 is a block diagram illustrating an example electronic device 201 according to various example embodiments of the present disclosure. The electronic device 201 may include, for example, all or a part of the electronic device 101 illustrated in FIG. 1. The electronic device 201 may include one or more processors (e.g., including processing circuitry) 210 (e.g., Application Processors (AP)), a communication module (e.g., including communication circuitry) 220, a Subscriber Identification Module (SIM) 224, a memory 230, a sensor module 240, an input device (e.g., including input circuitry) 250, a display 260, an interface (e.g., including interface circuitry) 270, an audio module 280, a camera module (e.g., including a camera) 291, a power management module 295, a battery 296, an indicator 297, and a motor 298. The processor 210 may include various processing circuitry configured to control a plurality of hardware or software components connected to the processor 210 by driving an operating system or an application program, and perform processing of various pieces of data and calculations. The processor 210 may be embodied as, for example, a System on Chip (SoC). According to an embodiment of the present disclosure, the processor 210 may further include a Graphic Processing Unit (GPU) and/or an image signal processor. The processor 210 may include at least some (for example, a cellular module 221) of the components illustrated in FIG. 2. The processor 210 may load, into a volatile memory, commands or data received from at least one (e.g., a non-volatile memory) of the other components and may process the loaded commands or data, and may store various data in a non-volatile memory.

The communication module 220 may have a configuration equal or similar to that of the communication interface 170 of FIG. 1. The communication module 220 may include various communication circuitry, such as, for example, and without limitation, a cellular module 221, a Wi-Fi module 223, a BT module 225, a GNSS module 227, an NFC module 228, and a Radio Frequency (RF) module 229. The cellular module 221, for example, may provide a voice call, a video call, a text message service, or an Internet service through a communication network. According to an embodiment of the present disclosure, the cellular module 221 may distinguish and authenticate the electronic device 201 in a communication network using the subscriber identification module 224 (for example, the SIM card). According to an embodiment of the present disclosure, the cellular module 221 may perform at least some of the functions that the AP 210 may provide. According to an embodiment of the present disclosure, the cellular module 221 may include a communication processor (CP). According to an embodiment of the present disclosure, at least some (e.g., two or more) of the Wi-Fi module 223, the BT module 225, the GNSS module 227, and the NFC module 228 may be included in one Integrated Chip (IC) or IC package. The RF module 229, for example, may transmit/receive a communication signal (e.g., an RF signal). The RF module 229 may include, for example, a transceiver, a Power Amplifier Module (PAM), a frequency filter, a Low Noise Amplifier (LNA), and an antenna. According to another embodiment of the present disclosure, at least one of the cellular module 221, the WIFI module 223, the BT module 225, the GNSS module 227, and the NFC module 228 may transmit/receive an RF signal through a separate RF module. The subscriber identification module 224 may include, for example, a card including a subscriber identity module and/or an embedded SIM, and may contain unique identification information (e.g., an Integrated Circuit Card Identifier (ICCID)) or subscriber information (e.g., an International Mobile Subscriber Identity (IMSI)).

The memory 230 (e.g., the memory 130) may include, for example, an embedded memory 232 and/or an external memory 234. The embedded memory 232 may include at least one of a volatile memory (e.g., a Dynamic Random Access Memory (DRAM), a Static RAM (SRAM), a Synchronous Dynamic RAM (SDRAM), and the like) and a non-volatile memory (e.g., a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard disc drive, a Solid State Drive (SSD), and the like). The external memory 234 may further include a flash drive, for example, a Compact Flash (CF), a Secure Digital (SD), a Micro Secure Digital (Micro-SD), a Mini Secure Digital (Mini-SD), an eXtreme Digital (xD), a MultiMediaCard (MMC), a memory stick, or the like. The external memory 234 may be functionally and/or physically connected to the electronic device 201 through various interfaces.

The sensor module 240, for example, may measure a physical quantity or detect an operation state of the electronic device 201, and may convert the measured or detected information into an electrical signal. The sensor module 240 may include, for example, at least one of a gesture sensor 240A, a gyro sensor 240B, an atmospheric pressure sensor (barometer) 240C, a magnetic sensor 240D, an acceleration sensor 240E, a grip sensor 240F, a proximity sensor 240G, a color sensor 240H (e.g., red, green, and blue (RGB) sensor), a biometric sensor (medical sensor) 240I, a temperature/humidity sensor 240J, an illuminance (e.g., light) sensor 240K, and a Ultra Violet (UV) sensor 240M. Additionally or alternatively, the sensor module 240 may include, for example, an E-nose sensor, an electromyography (EMG) sensor, an electroencephalogram (EEG) sensor, an electrocardiogram (ECG) sensor, an Infrared (IR) sensor, an iris scan sensor, and/or a finger scan sensor. The sensor module 240 may further include a control circuit for controlling one or more sensors included therein. According to an embodiment of the present disclosure, the electronic device 201 may further include a processor configured to control the sensor module 240, as a part of the processor 210 or separately from the processor 210, and may control the sensor module 240 while the processor 210 is in a sleep state.

The input device 250 may include various input circuitry, such as, for example, and without limitation, a touch panel 252, a (digital) pen sensor 254, a key 256, or an ultrasonic input device 258. The touch panel 252 may use, for example, at least one of a capacitive type, a resistive type, an infrared type, and an ultrasonic type. The touch panel 252 may further include a control circuit. The touch panel 252 may further include a tactile layer, and provide a tactile reaction to the user. The (digital) pen sensor 254 may include, for example, a recognition sheet which is a part of the touch panel or is separated from the touch panel. The key 256 may include, for example, a physical button, an optical key or a keypad. The ultrasonic input device 258 may detect, through a microphone (e.g., the microphone 288), ultrasonic waves generated by an input tool, and identify data corresponding to the detected ultrasonic waves.

The display 260 (e.g., the display 160) may include a panel 262, a hologram device 264, a projector 266, and/or a control circuit to control thereof. The panel 262 may be implemented to be, for example, flexible, transparent, or wearable. The panel 262 may be embodied as a single module with the touch panel 252. The hologram device 264 may show a three dimensional (3D) image in the air by using an interference of light. The projector 266 may project light onto a screen to display an image. The screen may be located, for example, in the interior of or on the exterior of the electronic device 201. The interface 270 may include various interface circuitry, such as, for example, and without limitation, a High-Definition Multimedia Interface (HDMI) 272, a Universal Serial Bus (USB) 274, an optical interface 276, or a D-subminiature (D-sub) 278. The interface 270 may be included in, for example, the communication interface 170 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, for example, may bilaterally convert a sound and an electrical signal. At least some components of the audio module 280 may be included in, for example, the input/output interface 150 illustrated in FIG. 1. The audio module 280 may process voice information input or output through, for example, a speaker 282, a receiver 284, earphones 286, or the microphone 288. The camera module 291 may include various circuitry including, for example, and without limitation, a camera, a device which may photograph a still image and a video, or the like. According to an embodiment of the present disclosure, the camera module 291 may include one or more image sensors (e.g., a front sensor or a back sensor), a lens, an Image Signal Processor (ISP) or a flash (e.g., LED or xenon lamp). The power management module 295 may manage, for example, power of the electronic device 201. According to an embodiment of the present disclosure, the power management module 295 may include a Power Management Integrated Circuit (PMIC), a charger Integrated Circuit (IC), or a battery or fuel gauge. The PMIC may use a wired and/or wireless charging method. Examples of the wireless charging method may include, for example, a magnetic resonance method, a magnetic induction method, an electromagnetic wave method, and the like. Additional circuits (e.g., a coil loop, a resonance circuit, a rectifier, etc.) for wireless charging may be further included. The battery gauge may measure, for example, a residual quantity of the battery 296, and a voltage, a current, or a temperature while charging. The battery 296 may include, for example, a rechargeable battery and/or a solar battery.

The indicator 297 may display a particular state (e.g., a booting state, a message state, a charging state, or the like) of the electronic device 201 or a part (e.g., the processor 210) of the electronic device 201. The motor 298 may convert an electrical signal into a mechanical vibration, and may generate a vibration, a haptic effect, or the like. The electronic device 201 may include a mobile TV supporting device (e.g., a GPU) to process media data according to a certain standard such as, for example, Digital Multimedia Broadcasting (DMB), Digital Video Broadcasting (DVB), or mediaFLO™. According to various embodiments of the present disclosure, some of the above-described elements may be omitted from the electronic device, or the electronic device may further include additional elements, or some of the hardware components according to various embodiments may be combined into one entity, which may perform functions identical to those of the relevant components before the combination.

Figure 3:
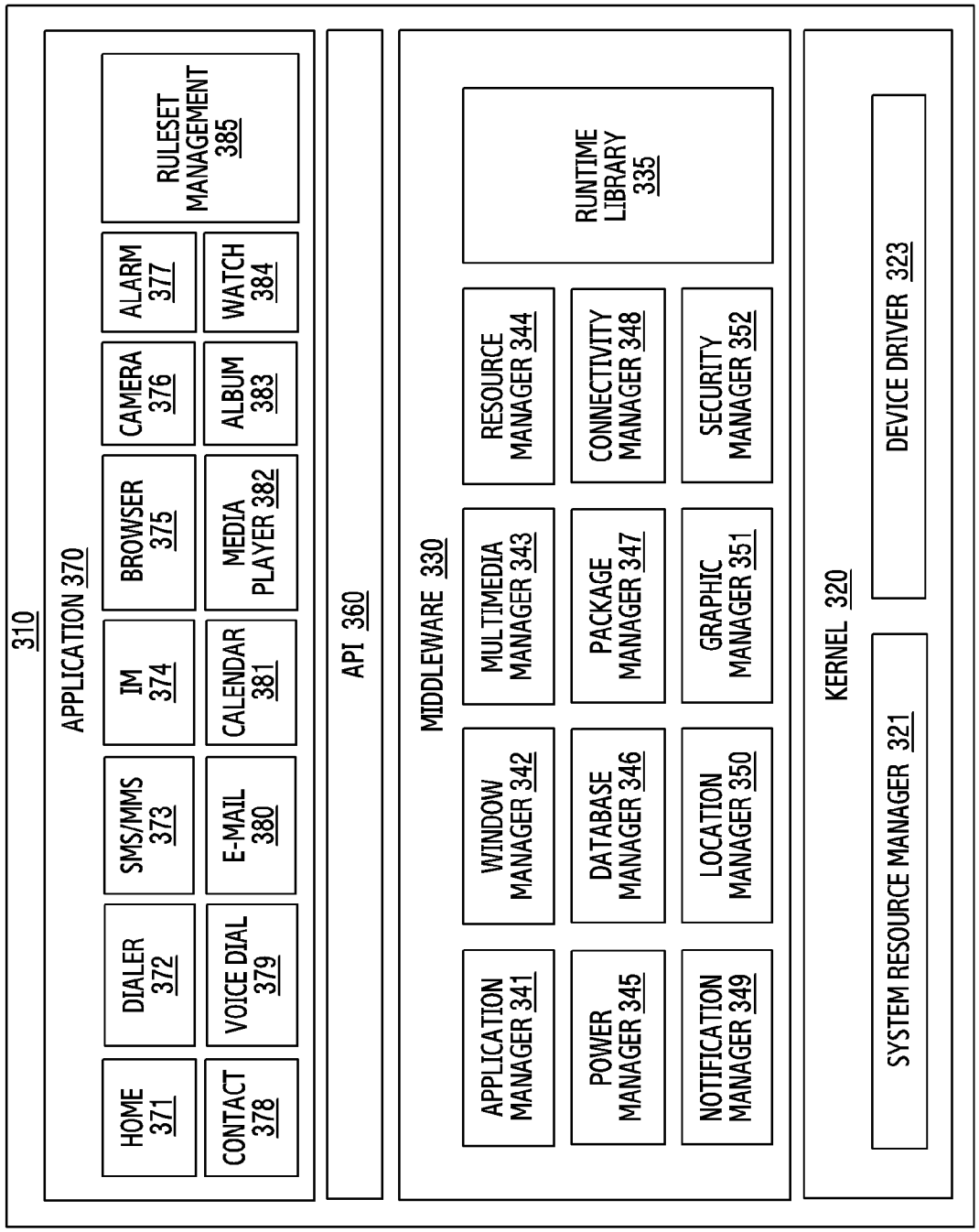
FIG. 3 illustrates a block diagram of a program module according to various embodiments of the disclosure.

FIG. 3 is a block diagram illustrating an example program module according to various example embodiments of the present disclosure. According to an embodiment of the present disclosure, the program module 310 (e.g., the program 140) may include an Operating System (OS) for controlling resources related to the electronic device (e.g., the electronic device 101) and/or various applications (e.g., the application programs 147) executed in the operating system. The operating system may be, for example, Android™, iOS™, Windows™, Symbian™, Tizen™, Bada™, or the like. According to FIG. 3, the program module 310 may include a kernel 320 (e.g., the kernel 141), middleware 330 (e.g., the middleware 143), an API 360 (e.g., the API 145), and/or applications 370 (e.g., the applications 147). At least some of the program module 310 may be preloaded on an electronic device, or may be downloaded from an external electronic device (e.g., the electronic device 102 or 104, or the server 106).

The kernel 320 may include, for example, a system resource manager 321 and/or a device driver 323. The system resource manager 321 may control, allocate, or collect system resources. According to an embodiment of the present disclosure, the system resource manager 321 may include a process management unit, a memory management unit, a file system management unit, and the like. The device driver 323 may include, for example, a display driver, a camera driver, a Bluetooth driver, a shared memory driver, a USB driver, a keypad driver, a Wi-Fi driver, an audio driver, or an Inter-Process Communication (IPC) driver. For example, the middleware 330 may provide a function required in common by the applications 370, or may provide various functions to the applications 370 through the API 360 so as to enable the applications 370 to efficiently use the limited system resources in the electronic device. According to an example embodiment of the present disclosure, the middleware 330 (e.g., the middleware 143) may include at least one of a run time library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, and a security manager 352.

The runtime library 335 may include a library module that a compiler uses in order to add a new function through a programming language while an application 370 is being executed. The runtime library 335 may perform input/output management, memory management, the functionality for an arithmetic function, or the like. The application manager 341 may manage, for example, a life cycle of at least one of the applications 370. The window manager 342 may manage Graphical User Interface (GUI) resources used by a screen. The multimedia manager 343 may recognize a format required for reproduction of various media files, and may perform encoding or decoding of a media file by using a codec suitable for the corresponding format. The resource manager 344 may manage resources of a source code or a storage space of the memory. The power manager 345 may manage, for example, a battery or power source and may provide power information or the like required for the operations of the electronic device. According to an embodiment of the present disclosure, the power manager 345 may operate together with, for example, a Basic Input/Output System (BIOS). The database manager 346 may generate, search for, and/or change a database to be used by at least one of the applications 370. The package manager 347 may manage installation or an update of an application distributed in a form of a package file.

For example, the connectivity manager 348 may manage wireless connectivity such as Wi-Fi or Bluetooth. The notification manager 349 may display or notify of an event such as an arrival message, promise, proximity notification, and the like in such a way that does not disturb a user. The location manager 350 may manage location information of an electronic device. The graphic manager 351 may manage a graphic effect which will be provided to a user, or a user interface related to the graphic effect. The security manager 352 may provide, for example, system security or user authentication. According to an embodiment of the present disclosure, the middleware 330 may further include a telephony manager for managing a voice call function or a video call function of the electronic device or a middleware module that forms a combination of various functions of the above-described components. According to one embodiment of the present disclosure, the middleware 330 may provide a module specialized for each type of OS in order to provide a differentiated function. Further, the middleware 330 may dynamically remove some of the existing components or add new components. The API 360 (e.g., the API 145) is, for example, a set of API programming functions, and may be provided with a different configuration according to an OS. For example, in the case of Android™ or iOS™, one API set may be provided for each platform. In the case of Tizen™, two or more API sets may be provided for each platform.

The application 370 may include, for example, a home 371, a dialer 372, a Short Message Service (SMS)/Multimedia Messaging Service (MMS) 373, an Instant Message (IM) 374, a browser 375, a camera 376, an alarm 377, a contact 378, a voice dial 379, an e-mail 380, a calendar 381, a media player 382, an album 383, a watch 384, a ruleset management 385, a health care (e.g., an application for measuring a physical activity level, a blood sugar level, etc.), or an application for providing environment information (e.g., providing atmospheric pressure, humidity, or temperature information). Herein, the ruleset management 385 may be an application capable of writing, editing, and storing a ruleset of the consecutive actions and events, and may be an application which provides an environment capable of using this. According to an embodiment, the application 370 may include an information exchanging application capable of supporting information exchange between the electronic device and an external electronic device. The information exchange application may include, for example, a notification relay application for relaying specific information to the external electronic device or a device management application for managing the external electronic device. For example, the notification relay application may relay notification information generated in another application of the electronic device to the external electronic device, or may receive notification information from the external electronic device and may provide it to the user. The device management application may install, delete, or update a function (e.g., turning on/turning off the external electronic device itself (or some components thereof) or adjusting a display illumination (or a resolution)) of an external electronic device which communicates with the electronic device, or an application which operates in the external electronic device. According to an embodiment, the application 370 may include an application specified according to an attribute of the external electronic device (e.g., a health management application of a mobile medical device). According to an embodiment, the application 370 may include an application received from the external electronic device. At least part of the program module 310 may be implemented (e.g., executed) in software, firmware, hardware (e.g., the processor 210), or at least two or more of combinations thereof, and may include modules, programs, routines, sets of instructions, or processes for performing one or more functions.

Hereinafter, various embodiments for executing and managing a conditional action will be described. Terms used in the following description are defined as follows.

A 'ruleset' may imply information indicating content of an action performed by the electronic device 101 and a condition for triggering the action. That is, the ruleset may be a set of one or more conditional actions. Herein, the action may be defined as a condition of another action. That is, the ruleset according to various embodiments may include a definition of consecutive actions. The ruleset may be referred to as 'information regarding a conditional action', 'a condition and action set', 'a trigger and action set', 'action information', 'recipe', or other terms having the same technical meaning.

A 'condition' may imply an event which must be precedent to execute an action in the electronic device 101. The condition may be defined as an internal change, an external change, or a combination of them. In various embodiments, the condition may be a target of modification, deletion, and addition. The condition may be referred to as a 'trigger event', a 'trigger', an 'event', or any other terms having the same technical meaning.

An 'action' may imply at least one function executed in the electronic device 101. The action may be initiated under a condition defined by the ruleset. Content of the ruleset may be defined as a specific function of a specific application or data used in the specific function. In various embodiments, the action may be a target of modification, deletion, and addition. The action may be referred to as an 'operation', a 'function', 'processing', a 'computation', or other terms having the same technical meaning.

A 'connector service' may imply a service for which at least one conditional action is executed according to a ruleset. In addition, the connector service may provide functions for managing the ruleset, such as storing, modifying, executing, or the like of the ruleset. The connector service may be referred to as a 'ruleset service', a 'conditional action service', or other terms having the same technical meaning.

The conventional connector service is not optimized to consecutive environments (e.g., an IoT environment, a healthcare platform, etc.) which are increasingly complex and diverse because of a structure in which one or multiple actions are executed simultaneously due to one trigger event, i.e., one condition. In addition, in the case of the conventional connector service, since rights protection and advertising effect of a creator who generates a ruleset including an event and an action are insignificant, there is a limitation in leading participation of third party developers and ruleset creators.

Accordingly, various embodiments of the disclosure provide an improved connector service capable of configuring a permission to disable modification or deletion for at least part of conditions or actions included in the ruleset. Therefore, the rights protection and advertising effect of the ruleset creator can be improved. In addition, reliability can be improved in the use of the ruleset by disabling modification for a sensitive action directly associated with life and security.

Figure 4:
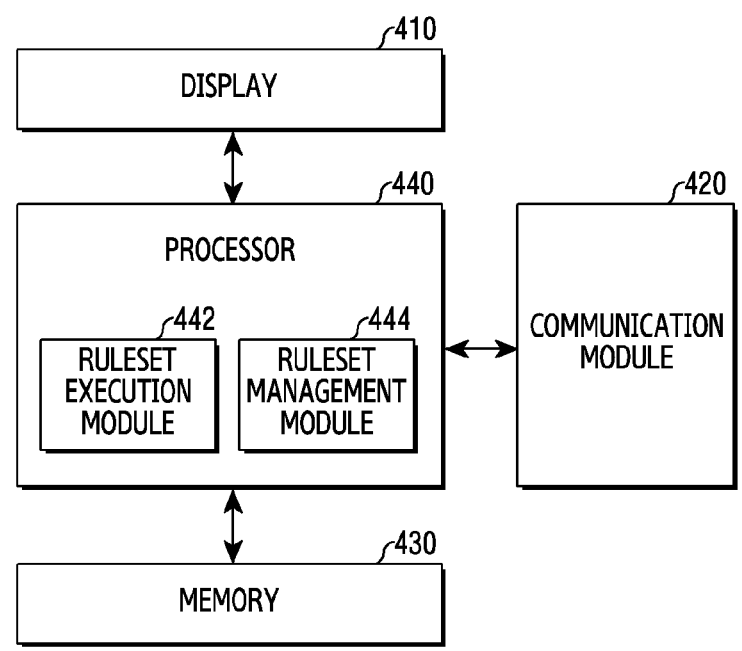
FIG. 4 illustrates a functional structure of an electronic device according to various embodiments of the disclosure.

FIG. 4 illustrates a functional structure of an electronic device according to various embodiments of the disclosure. A structure of the electronic device 101 or the electronic device 102 is illustrated in FIG. 4. The structure of FIG. 4 may be understood as the structure of the electronic device 101 or electronic device 102.

Referring to FIG. 4, the electronic device 101 or the electronic device 102 may include a display 410, a communication module 420, a memory 430, and a processor 440.

The display 410 may be a component for displaying a screen of the electronic device 101. For example, the display 410 may be constructed of at least one of an OLED, a Quantum-dot Light Emitting Diode (QLED), and an LCD. The display 410 may be a component corresponding to the display 160 of FIG. 1 or the display 260 of FIG. 2.

The communication module 420 may perform functions for communicating with other devices. The communication module 420 may provide an interface through which the electronic device 101 or the electronic device 102 performs communication through a wired channel or a wireless channel. For example, the communication module 420 may perform conversion between data and a physical signal. The communication module 420 may be a component corresponding to the communication interface 170 of FIG. 1 or the communication module 220 of FIG. 2.

The memory 430 may store data such as a basic program, application program, configuration information, or the like for an operation of the electronic device 101 or the electronic device 102. The memory 430 may be constructed of a volatile memory, a non-volatile memory, or a combination of the volatile memory and the non-volatile memory. In addition, the memory 430 may provide the stored data according to a request of the processor 440. The memory 430 may be a component corresponding to the memory 130 of FIG. 1 or the memory 230 of FIG. 2.

The processor 440 may control overall operations of the electronic device 101 or electronic device 102. For example, the processor 440 may control screen displaying of the display 410, and may control signal processing of the communication module 420. In addition, the processor 440 may read or write data in the memory 430, and may execute an application, code, or the like stored in the memory 430. For example, the processor 440 may control the electronic device 101 or the electronic device 102 to perform an operation according to various embodiments described below. The processor 440 may be a component corresponding to the processor 120 of FIG. 1 or the processor 210 of FIG. 2.

Figure 5A:
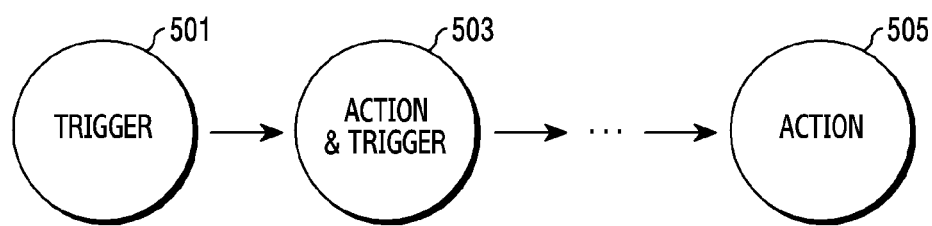
FIG. 5A and FIG. 5B illustrate an example of conditional actions executed in an electronic device according to various embodiments of the disclosure.
Figure 5B:
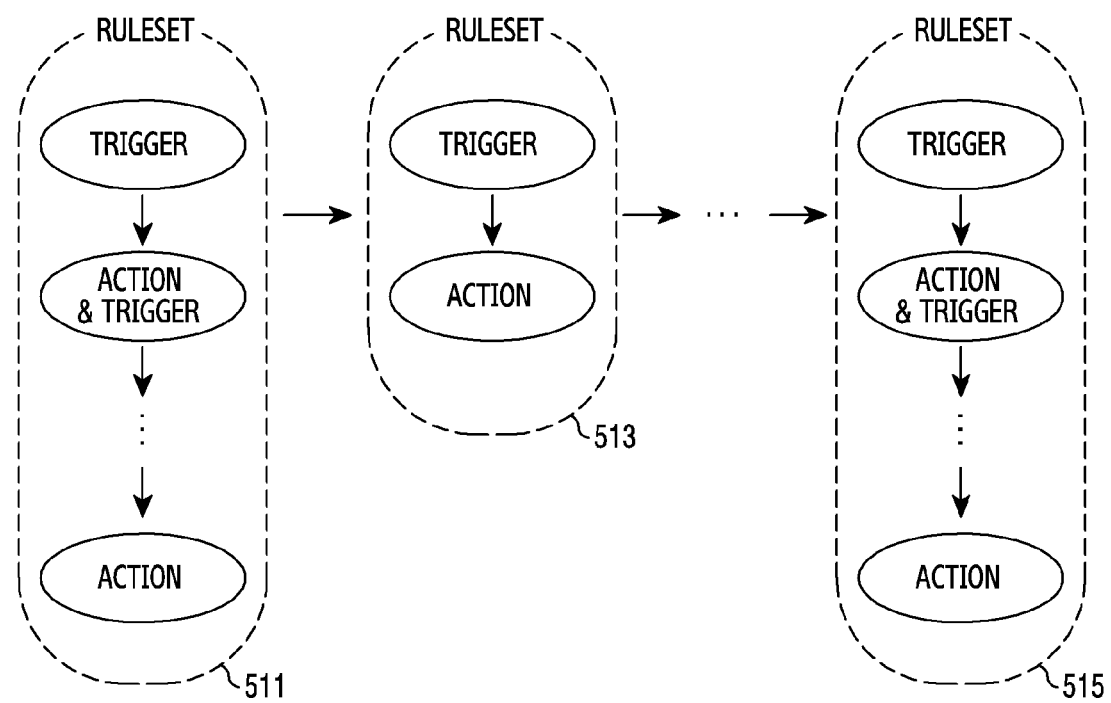

According to various embodiments, the processor 440 may include a ruleset execution module 442 to execute a ruleset. The ruleset execution module 442 may have a permission to control functions of other applications to execute the ruleset. In this case, the ruleset executed by the ruleset execution module 442 may have the same structure as shown in FIG. 5A or FIG. 5B. Referring to FIG. 5A, a trigger 501 may be defined, and an action and trigger 503 corresponding to the trigger 501 may be defined. The action and trigger 503 may include an action, and may be used as a trigger for another action at the same time. That is, a plurality of actions may be defined consecutively, and an action 505 which does not operate as at least one trigger may be defined. Referring to FIG. 5B, a first sub-ruleset 511 may include at least one trigger, at least one action and trigger, and at least one action. In this case, the first sub-ruleset 511 may be used as a trigger of another second sub-ruleset 513. Similarly to FIG. 5A, the plurality of sub-rulesets 511, 513, and 515 may be defined consecutively. However, unlike in FIG. 5A, the ruleset of FIG. 5B is a set of the plurality of sub-rulesets 511, 513, and 515, and some rulesets (e.g., the first sub-ruleset 511, the second sub-ruleset 513) may function as a trigger. In the executing of the ruleset as described above, the ruleset execution module 442 may execute the ruleset stored in the memory 430, or may execute the ruleset through interaction with an external server (e.g., the server 106) having the ruleset.

According to various embodiments, the processor 440 may include a ruleset management module 444 to manage the ruleset. The ruleset management module 444 may provide a function such as ruleset generation, modification, permission configuration, deletion, or the like. For example, in case of the ruleset generation, the ruleset management module 444 may provide functions such as action generation, trigger generation, or permission configuration for the action or the trigger, uploading to an external service, processing for a permission change request, or the like. For another example, in case of using the ruleset, the ruleset management module 444 may provide functions such as downloading of the ruleset, deleting or modifying an action or trigger included in the ruleset, changing of a permission for the action or trigger included in the ruleset, or the like.

The ruleset execution module 442 and the ruleset management module 444 may be an instruction or the like resided at least temporarily in the processor 440 or a storage space for storing the instruction or the like, as an application, instruction set, or execution code stored in the memory 430. Alternatively, the ruleset execution module 442 and the ruleset management module 444 may be part of a circuitry constituting the processor 440. The processor 440 may perform functions related to the ruleset according to various embodiments via the ruleset execution module 442 and the ruleset management module 444.

Figure 6:
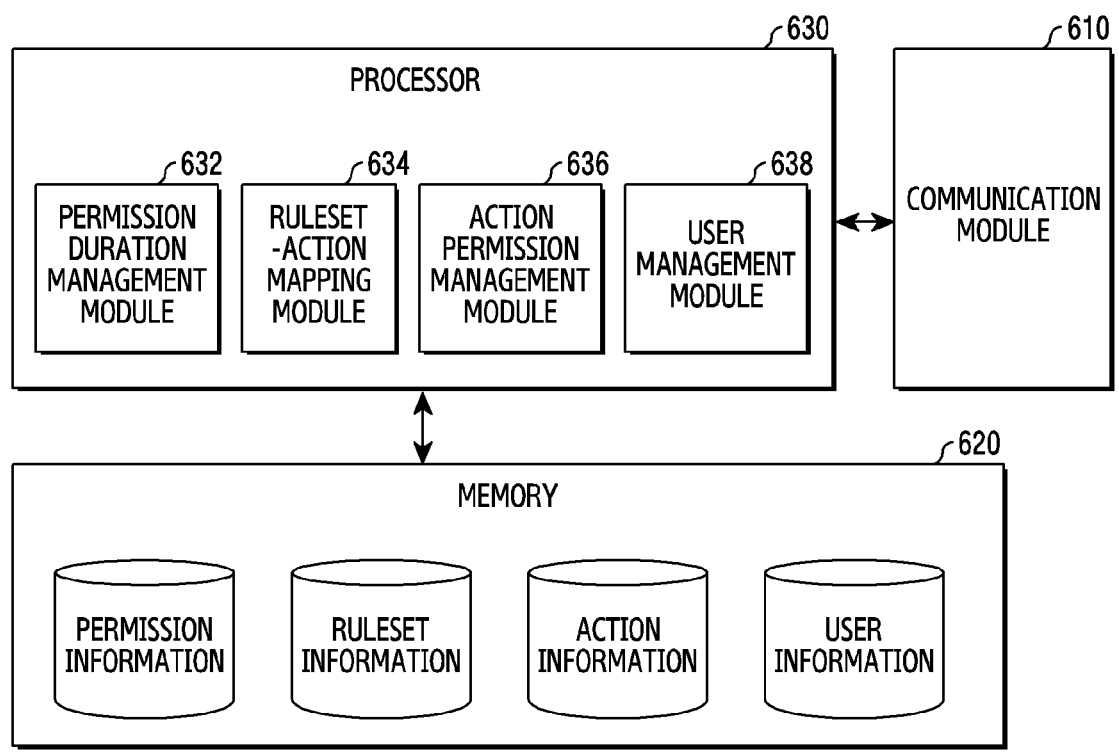
FIG. 6 illustrates a functional structure of a server according to various embodiments of the disclosure.

FIG. 6 illustrates a functional structure of a server according to various embodiments of the disclosure. A structure of the server 106 is exemplified in FIG. 6.

Referring to FIG. 6, the server 106 may include a communication module 610, a memory 620 (e.g., the memory 130, the memory 230), and a processor 630 (e.g., the processor 120, the processor 210).

The communication module 610 may perform functions for communicating with other devices. The communication module 610 may provide an interface through which the server 106 performs communication through a wired channel or a wireless channel. For example, the communication module 610 may perform conversion between data and a physical signal.

The memory 620 may store data such as a basic program, application program, configuration information, or the like for an operation of the server 106. The memory 620 may be constructed of a volatile memory, a non-volatile memory, or a combination of the volatile memory and the non-volatile memory. In addition, the memory 620 may provide the stored data according to a request of the processor 630. According to various embodiments, the memory 620 may store at least one of permission information, ruleset information, action information, and user information. The permission information may include information regarding a permission configured for an action or trigger. The information regarding the permission may include at least one of a limitation item (e.g., modification, deletion), a limitation duration, and a limitation cancelation duration. Ruleset information may include information regarding mapping for at least one trigger and at least one action. For example, the ruleset information may indicate a mapping relation in pair of a trigger index and an action index. The action information may include information regarding actions and triggers available to define the ruleset. In the action information, each of the actions and triggers may have a unique index. User information may have account information of users subscribed to a service for sharing the ruleset. In this case, the account information may include at least one of identification information of a corresponding user and information regarding devices constituting an internal network of the corresponding user.

The processor 630 may control operations of the server 106. For example, the processor 630 may control signal processing of the communication module 610. In addition, the processor 630 may read or write data in the memory 620, and may execute an application, code, or the like stored in the memory 620. For example, the processor 630 may control the server 106 to perform an operation according to various embodiments described below.

According to various embodiments, the processor 630 may include a permission duration management module 632 to control a duration related to a permission. The permission duration management module 632 may delete, generate, or modify ruleset information and the permission-related duration included in the permission information. For this, the permission duration management module 632 may have access to the ruleset information and permission information stored in the memory 620.

According to various embodiments, the processor 630 may include a ruleset-action mapping module 634 to manage information on the ruleset. The ruleset-action mapping module 634 may manage mapping information between at least one trigger and at least one action which define the ruleset. For this, the ruleset-action mapping module 634 may have access to the permission information, action information, and ruleset information stored in the memory 620.

According to various embodiments, the processor 630 may include an action permission management module 636 to control an action-related permission. The action permission management module 636 may delete, generate, or modify a permission for each of actions or triggers. For this, the action permission management module 636 may have access to permission information, action information, and user information stored in the memory 620.

According to various embodiments, the processor 630 may include a user management module 638 to manage information regarding a user. The user management module 638 may store user information when a user is registered, and may update or delete user information according to a request or the like. For this, the user management module 638 may have access to permission information and user information stored in the memory 620.

Hereinafter, various embodiments for generating, sharing, using, permission changing, or the like of a ruleset will be described. For convenience of explanation, as a device of using the ruleset, the 'electronic device 102' is exemplified as a device for generating the ruleset, and the 'server 106' is exemplified as a device for providing a function for sharing.

According to various embodiments of the disclosure, the electronic device 101 may download and use a ruleset generated by another device (e.g., the electronic device 102 or the electronic device 104). In this case, a permission for the ruleset, the action, the trigger, or the like may be configured, and the ruleset may be managed as follows according to content of the configured permission.

In an embodiment, upon generating the ruleset including the trigger and the action, the electronic device 102 may exclude modification and deletion permissions for any action. Therefore, a creation of a ruleset creator can be protected, and is prevented from being modified randomly, thereby having an advertising effect for the creator. Since the ruleset including the action excluding the modification and deletion permissions is shared via the server 106, the electronic device 101 may download the ruleset from the server 106 and may execute it. The electronic device 101 may perform management, such as reading, modification, deletion, or the like, for any action included in the ruleset. However, when the electronic device 102 corresponds to an action excluding the modification and deletion permissions, the electronic device 101 may perform only reading. Therefore, in order to adapt to a unique operating environment of the electronic device 101, the electronic device 101 may request the electronic device 102 to change the permission, and may use it after performing optimization for the operating environment or may download another ruleset according to the operating environment.

In another embodiment, upon generating the ruleset including the trigger and the action, the electronic device 102 may exclude the modification permission for any action. Therefore, it is possible to prevent a situation where security cannot be guaranteed or copyright is violated by randomly modifying an action sensitive to the security and the copyright. The ruleset including the action excluding the modification permission may be shared via the server 106, and the electronic device 101 may download and execute the ruleset. The electronic device 101 can read and delete the action excluding the modification permission, but cannot modify it. To modify the action, the electronic device 101 may request the electronic device 102 to change the permission.

In another embodiment, upon generating the ruleset including the trigger and the action, the electronic device 102 may exclude the reading and modification permissions for any action. Therefore, in case of including an action sensitive to copyright and rights protection, a copyright owner and a rights holder can be protected. The ruleset excluding the reading and modification permissions may be shared via the server 106, and the electronic device 101 may download and execute the ruleset. The electronic device 101 may perform only detection of a corresponding action of which reading and modification are prohibited, and may request the electronic device 102 to change the reading and modification permissions.

In another embodiment, upon generating the ruleset including the trigger and the action, the electronic device 102 may exclude all of the reading, modification, and deletion permissions for any action. Therefore, reading is not supported for an action which may have a security issue, and all of reading, modification, and deletion may be impossible for a user who does not acquire an approval. A ruleset including an action excluding all permissions may be shared via the server 106, and the electronic device 101 may download and execute the ruleset. The electronic device 101 cannot use any function of a corresponding action, and may request the electronic device 102 to change the reading, modification, and deletion permissions.

In another embodiment, upon generating the ruleset including the trigger and the action, the electronic device 102 may be configured such that any action is automatically deleted after a duration of validity. Therefore, in case of an action sensitive to copyright and rights protection, a usage thereof may be approved only during a specific duration. The electronic device 101 may read, modify, and delete a corresponding action only during the duration of validity, and the action may be automatically deleted when the duration of validity expires. In addition, the electronic device 102 may receive information indicating that any action of which a duration of validity is determined in the electronic device 101 is deleted from the server 106.

In another embodiment, upon generating the ruleset including the trigger and the action, the electronic device 102 may enable the reading and modification for any action after the duration of validity. Therefore, an act based on a specific action may be configurable if it disappears after a specific duration elapses. The ruleset including an action configured such that reading and modification are possible after the duration of validity may be shared with the server 106, and the electronic device 101 may download and execute the ruleset. The electronic device 101 cannot perform reading and modification during the duration of validity. When the duration of validity expires, the electronic device 101 may read and modify a corresponding action. In addition, the electronic device 102 may receive information indicating that there is a change in a permission configuration of a corresponding action of a corresponding ruleset from the server 106.

Figure 7:
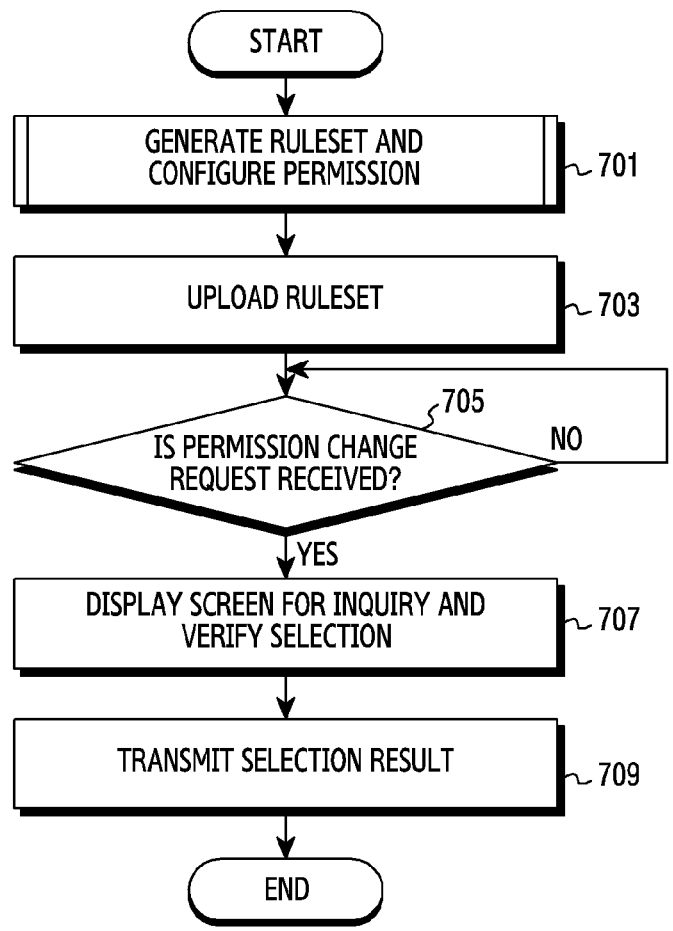
FIG. 7 is a flowchart for an operation of an electronic device for generating a ruleset according to various embodiments of the disclosure.

FIG. 7 is a flowchart for an operation of an electronic device for generating a ruleset according to various embodiments of the disclosure. A method of operating the electronic device 102 is exemplified in FIG. 7.

Referring to FIG. 7, in operation 701, the electronic device 102 may generate a ruleset and configure a permission. The electronic device 102 is a device used by a creator of the ruleset, and the electronic device 102 generates the ruleset by mapping at least one trigger and at least one action according to an input of the creator. In addition, the electronic device 102 may configure a permission (e.g., a limitation for modification, a limitation for deletion) for at least one trigger and at least one action according to the input of the creator.

In operation 703, the electronic device 102 may update the ruleset. In other words, the electronic device 102 may have access to the server 106 and transmit the ruleset to the server 106 according to the input of the creator. In this case, the ruleset may be uploaded to be shared with another electronic device (e.g., the electronic device 101). Herein, the ruleset may include at least one trigger and at least one action of which a permission is limited.

In operation 705, the electronic device 102 may verify whether a request for a permission change is received. The request for the permission change may be received from the server 106, and may be initiated from another electronic device (e.g., the electronic device 101). Herein, the request for the permission change may include at least one of identification information regarding an action or trigger which is a target of modification, content (e.g., modification, deletion, or the like) of a permission to be acquired, and identification information of a requester.

Upon receiving the request for the permission change, in operation 707, the electronic device 102 may display a screen for inquiry and may identify selection of the creator. That is, in order to verify an intention of the creator for the permission change, the electronic device may display a screen which requests for the selection of the user. The screen may include information regarding a permission to be acquired by a request target and a requester and an interface component (e.g., a button) for detecting the selection of the creator.

In operation 709, the electronic device 102 may transmit a selection request. That is, the electronic device 102 may identify whether the permission change of the creator is approved, and may report an identification result to the server 106. In addition, the electronic device 102 may store the selection result.

Figure 8:
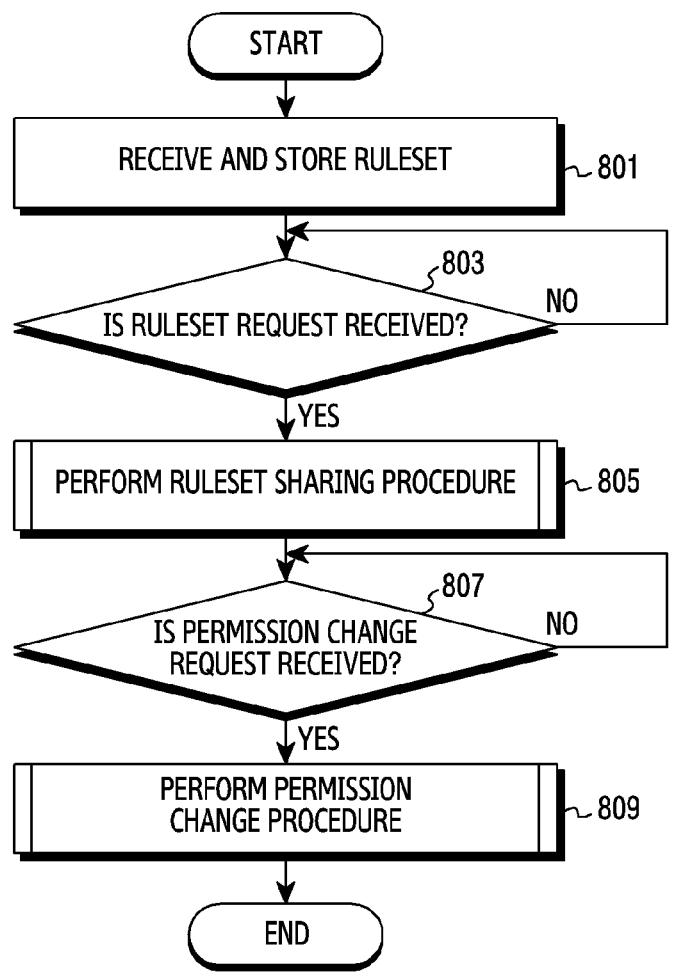
FIG. 8 is a flowchart for an operation of a server for managing a ruleset according to various embodiments of the disclosure.

FIG. 8 is a flowchart for an operation of a server for managing a ruleset according to various embodiments of the disclosure. A method of operating the server 106 is exemplified in FIG. 8.

Referring to FIG. 8, in operation 801, the server 106 may receive a ruleset and store the ruleset. In other words, the server 106 may store the ruleset uploaded from an electronic device (e.g., the electronic device 102) of a creator. Since the ruleset is stored to be shared, the server 106 may release information regarding the ruleset through a medium (e.g., a webpage, etc.) accessible from the outside. Accordingly, another device (e.g., the electronic device 101) may verify the ruleset stored in the server 106.

In operation 803, the server 106 may verify whether a request for the ruleset is received. The request for the ruleset may include identification information regarding the ruleset. For example, another device (e.g., the electronic device 101) may transmit a message for downloading the ruleset to the server 106 by identifying the ruleset stored in the server 106. The server 106 may receive the request for the ruleset, i.e., a sharing request.

Upon receiving the request for the ruleset, in operation 805, the server 106 may perform a procedure for sharing the ruleset. Specifically, the server 106 may verify the requested ruleset and identify data of a ruleset requested in the memory 620, and thereafter may packetize data and transmit it to the requester (e.g., the electronic device 101). In addition, the server 106 may store a log for downloading of the ruleset into user information or ruleset information.

Thereafter, in operation 807, the server 106 may verify whether a request for a permission change is received. The request for the permission change may be received from a device (e.g., the electronic device 101) which has downloaded the ruleset. The request for the permission change may include information regarding a target ruleset, information regarding a target action or trigger, content of a permission for modification, or the like.

Upon receiving the request for the permission change, in operation 809, the server 106 may perform a procedure for the permission change. Specifically, the server 106 may transmit a message for verifying an intention of a creator to a device (e.g., the electronic device 102) of the creator, and may verify a response for the intention verification from the device of the creator. If there is an approval of the creator, the server 106 may change a permission of a corresponding action or trigger according to an intention of a user who has requested for the permission change. The permission may be modified by at least one of updating of the permission information and issuing of a token.

Figure 9:
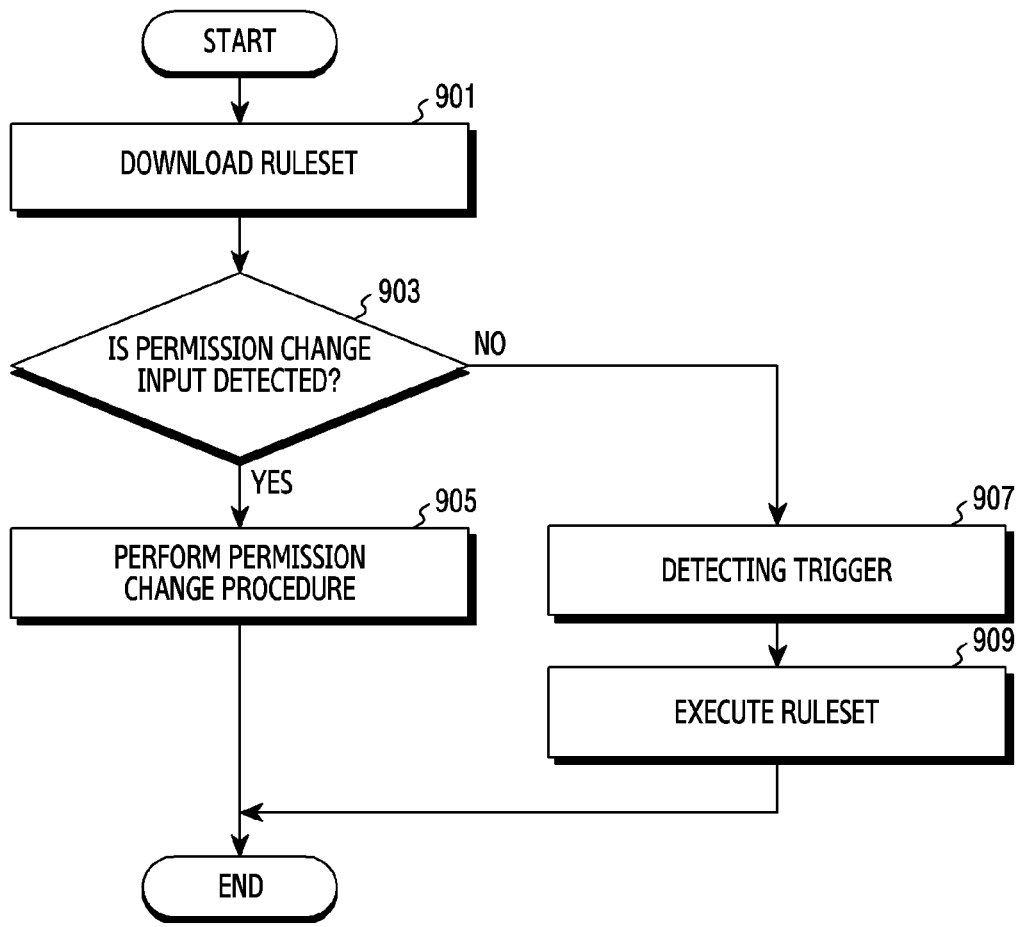
FIG. 9 is a flowchart for an operation of an electronic device which uses a ruleset according to various embodiments of the disclosure.

FIG. 9 is a flowchart for an operation of an electronic device which uses a ruleset according to various embodiments of the disclosure. A method of operating the electronic device 101 is exemplified in FIG. 9.

Referring to FIG. 9, in operation 901, the electronic device 101 may download a ruleset. For this, the processor 440 may have access to a server (e.g., the server 106) for sharing the ruleset, may request the server to provide at least one ruleset selected by a user, and may receive at least one ruleset from the server. The received ruleset may be stored in the memory 430.

In operation 903, the electronic device 101 may verify whether an input for a permission change is detected. The input for the permission change is generated by a user, and the processor 440 may detect the input for the permission change by detecting an input for an object (e.g., a button) defined for modification in a screen which displays the ruleset. For example, the permission change may include at least one of change and deletion of content for an action or trigger.

Upon detecting the input for the permission change, in operation 905, the electronic device 101 may perform a procedure for the permission change. Specifically, the processor 440 may verify content of a permission change, which is intended by a user, a target ruleset, and a target action or trigger, may generate a message for requesting for the permission change, and thereafter may transmit the message to the server 106. Thereafter, upon receiving a positive response for the permission change, the processor 440 may display a screen for reporting to the user that the permission change is accepted. Upon receiving a negative response for the permission change, the processor 440 may display a screen for reporting that the permission change is not accepted.

In operation 907, the electronic device 101 may determine whether a trigger is detected. In other words, the processor 440 may verify whether there is an event conforming to a trigger defined in the ruleset. In this case, the trigger may be an independent trigger, a trigger involving an action, or a trigger involving a ruleset.

Upon detecting the trigger, in operation 909, the electronic device 101 may execute the ruleset. In other words, the processor 440 may execute at least one action included in the ruleset corresponding to the trigger. In this case, when the action is defined as the trigger, the processor 440 may determine again the occurrence of the trigger according to the execution of the action, and may execute a plurality of actions consecutively. The processor 440 may transmit information indicating a result of executing the action to the server 106.

Figure 10:
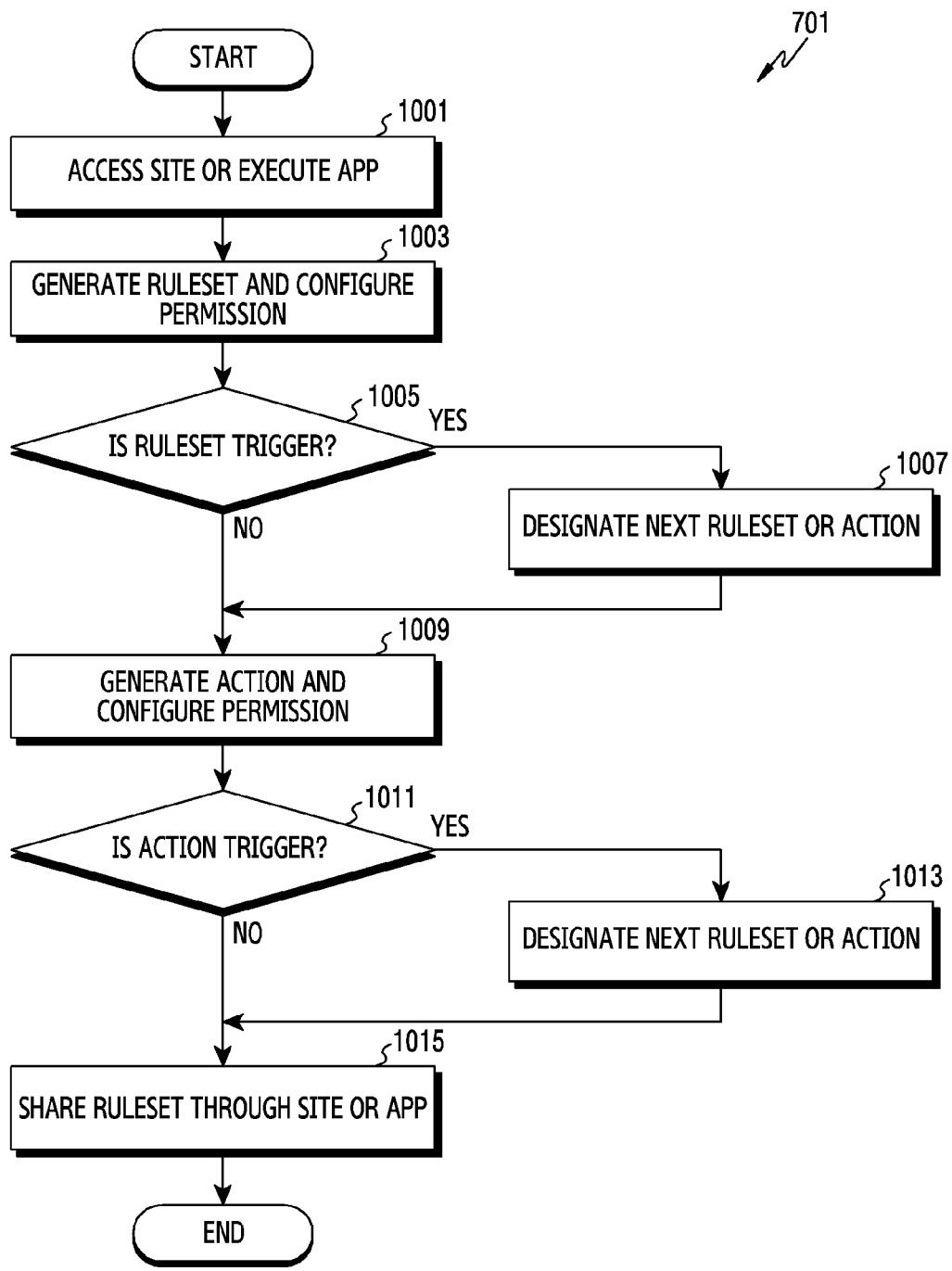
FIG. 10 is a flowchart for generating a ruleset in an electronic device according to various embodiments of the disclosure.

FIG. 10 is a flowchart for generating a ruleset in an electronic device according to various embodiments of the disclosure. A method of operating the electronic device 102 is exemplified in FIG. 10. Specifically, FIG. 10 exemplifies a method of creating a ruleset in the electronic device 102 and sharing the ruleset via the server 106.

Referring to FIG. 10, in operation 1001, the electronic device 102 may have access to a site or execute an application. Herein, the site may be provided by a server (e.g., the server 106) for sharing a ruleset, and may provide a function for generating the ruleset. That is, the electronic device 102 may execute a tool for generating the ruleset. Through the site or the application, the electronic device 102 may write a ruleset including at least one trigger and at least one action.

In operation 1003, the electronic device 102 may generate the ruleset, and may configure a permission. In this case, the electronic device 102 may generate the ruleset on the basis of an action and trigger pre-stored in the server 106 or newly-defined action and trigger information. In addition, the electronic device 102 may configure the permission of the ruleset. In other words, the electronic device 102 may limit a permission of modification and deletion for the ruleset.

In operation 1005, the electronic device 102 may determine whether the generated ruleset is a trigger. The electronic device 102 may determine the ruleset as the trigger or an independent ruleset. If the ruleset is the trigger, a new ruleset or a subsequent action after the execution of the ruleset may be executed. If the ruleset is not the trigger, there may be no subsequent action.

If the ruleset is the trigger, in operation 1007, the electronic device 102 may designate a next ruleset or action. That is, if it is determined that the ruleset is the trigger, since the ruleset generated in operation 1003 is a trigger of a next-step action or ruleset, the next-step action or ruleset may be designated. If the next step is not designated, operations based on consecutive connectors may stop.

If the ruleset is not the trigger, in operation 1009, the electronic device 102 may generate the action and configure the permission. In other words, the electronic device 102 may generate at least one action included in the ruleset.

In operation 1011, the electronic device 102 may determine whether the action is the trigger. That is, the electronic device 102 may determine the action as the trigger or the independent action. If the action is the trigger, a next action or ruleset may start after the execution of the action. If the action is not the trigger, there may be no more next action.

If the action is the trigger, in operation 1013, the electronic device 102 may designate a next ruleset or action. That is, if it is determined that the action is the trigger, since it is possible to define the next action or ruleset, the next ruleset or action may be designated.

In operation 1015, the electronic device 102 may share the ruleset through the site or the application. That is, the electronic device 102 may transmit at least one ruleset including at least one action and at least one trigger to the server 106. Accordingly, the server 106 may release a ruleset generated by the electronic device 102 through the site or the like, and another device (e.g., the electronic device 101) may download the ruleset.

Figure 11:
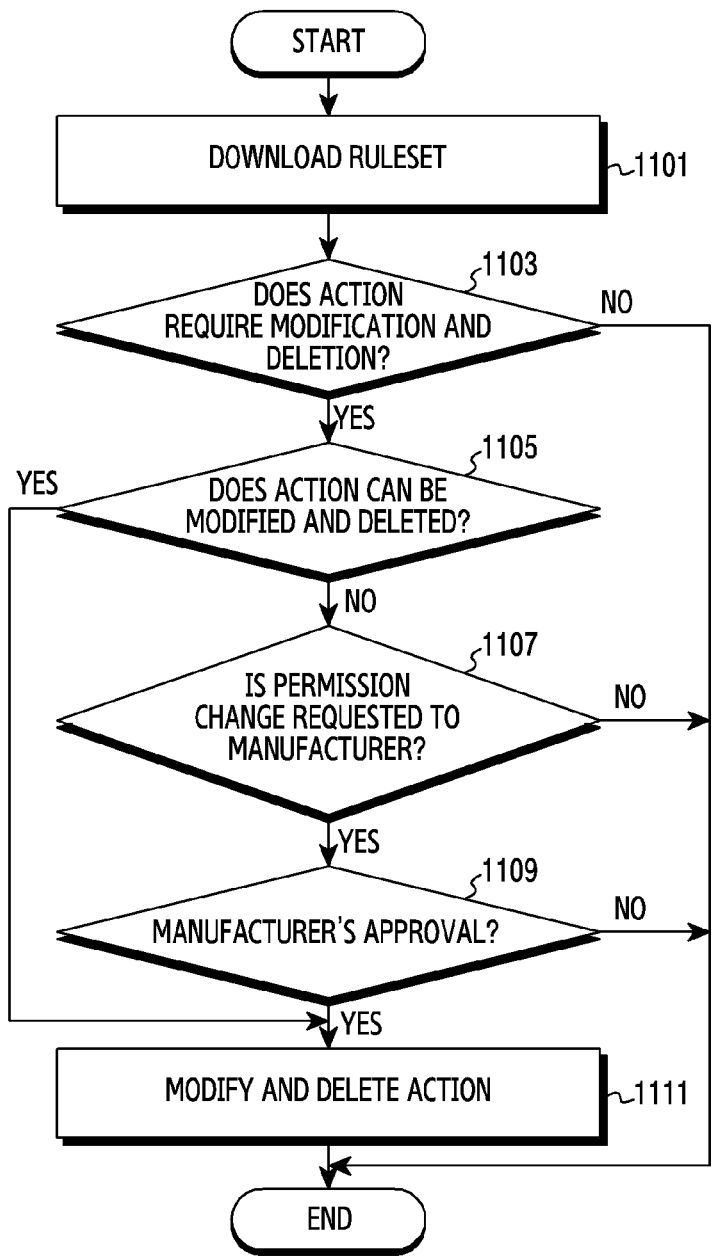
FIG. 11 is a flowchart for executing a ruleset and changing a permission in an electronic device according to various embodiments of the disclosure.

FIG. 11 is a flowchart for executing a ruleset and changing a permission in an electronic device according to various embodiments of the disclosure. A method of operating the electronic device 101 is exemplified in FIG. 11. Specifically, FIG. 11 exemplifies a method of downloading a ruleset in the electronic device 101 and requesting the server 106 to change a permission.

Referring to FIG. 11, in operation 1101, the electronic device 101 may download a ruleset. The electronic device 101 may be coupled to the server 106 by having access to the site or executing the application, and may download a ruleset including a trigger and/or an action. Thereafter, in operation 1103, the electronic device 101 may determine whether modification and/or detection of the action is required. In order to optimize the ruleset in an operating environment, modification and/or deletion of any action may be required. Accordingly, a user of the electronic device 101 may determine whether modification and/or deletion is required for each action. If the modification and deletion is unnecessary for the action, the procedure may end.

In operation 1105, the electronic device 101 may verify whether modification and/or detection of the action is possible. In other words, the electronic device 101 may determine whether there is a permission of modification and/or deletion for a corresponding action.

If it is determined in operation 1105 that there is a permission for modifying an action and/or a permission for deleting the action, or if an approval of a creator is verified in operation 1109, in operation 1111, the electronic device 101 may modify or delete the action.

If the electronic device 101 has the permission of modification and/or deletion for the action, in operation 1111, the electronic device 101 may optimize the ruleset to the operating environment by modifying and/or deleting the action. However, if the permission is limited so that the modification and/or deletion of the action is not free, the electronic device 101 may request the electronic device 102 to change the permission.

In operation 1107, the electronic device 101 may determine whether to transmit to the electronic device 102 a signal which requests for a permission change to modify or delete the action. The electronic device 101 may end an operation for modifying or deleting the action in response to the determining not to transmit the signal. The electronic device 101 may transmit a signal for requesting for the permission change in response to the determining to transmit the signal. The signal may be transmitted from the electronic device 101 to the electronic device 102 via the server 106.

In operation 1109, the electronic device 101 may receive a signal indicating a creator's response related to a ruleset from the electronic device 102. The electronic device 101 may identify whether the creator has accepted the permission change on the basis of receiving of the signal indicating the response of the creator.

Figure 12A:
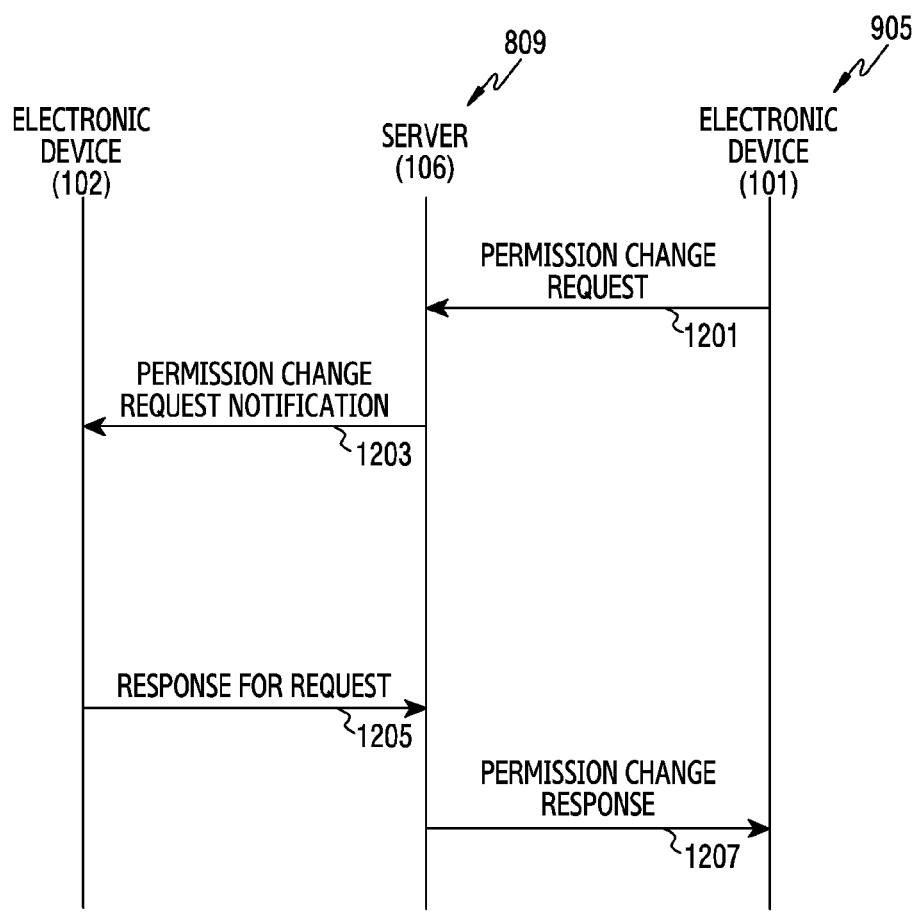
FIG. 12A illustrates a signal flow for a permission change according to various embodiments of the disclosure.

FIG. 12A illustrates a signal flow for a permission change according to various embodiments of the disclosure. A signal exchange among the electronic device 101, the electronic device 102, and the server 106 which process a permission change requested by the electronic device 101 is exemplified in FIG. 12A.

Referring to FIG. 12A, in operation 1201, the electronic device 101 may request the server 106 to change a permission for an action or ruleset. In other words, when a user requests for the permission change, the electronic device 101 may transmit information on a ruleset and action requested to be modified, user information, information regarding the requested permission, or the like to the server 106.

Figure 12B:
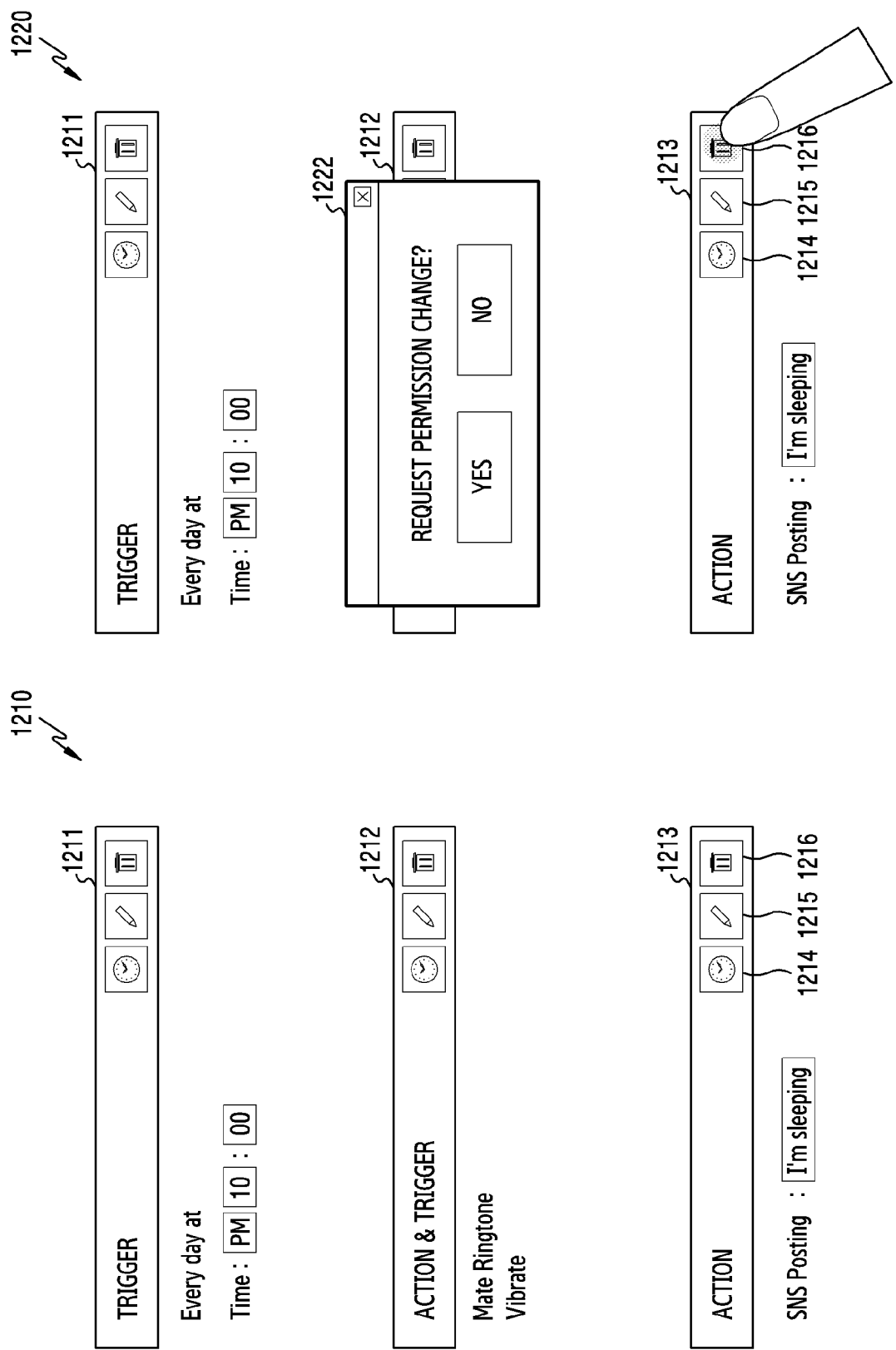
FIG. 12B illustrates an example of screens which request for a permission change in an electronic device according to various embodiments of the disclosure.

For example, when the electronic device 101 executes a ruleset downloaded from the server 106, as shown in a first screen 1210 of FIG. 12B, a ruleset consisting of a trigger 1211, an action & trigger 1212, and an action 1213 may be displayed on the display 160. In this case, icons 1214 to 1216 related to the action 1213 may be displayed. Specifically, the icon 1214 for a duration of validity, the icon 1215 for modification, and the icon 1216 for deletion may be displayed. Although not shown in FIG. 12B, according to a permission configuration of the creator, the electronic device 101 may display whether it has a permission according to visual effects (e.g., a presence/absence of shading, a color change, indication addition, or the like) or object attribute control (e.g., inactivation) to the icons 1214 to 1216. In some embodiments, if there is no permission of deletion for the action 1213, the icon 1216 for deletion may be shaded, and may be set to an inactive state.

Upon instructing a management corresponding to the permission not owned by the electronic device 101, the electronic device 101 may report that the user does not have the permission. For example, as shown in a second screen 1220 of FIG. 12B, if there is a touch input for the icon 1216 for deletion, a pop-up window 1222 for inquiring whether to request for the permission change may be displayed on the display 160 of the electronic device 101. Accordingly, the user may instruct the request for the permission change. The pop-up window 1222 may disappear when 'no' is selected. In addition, the electronic device may transmit a permission change request to the server 106 when 'yes' is selected.

Figure 12C:
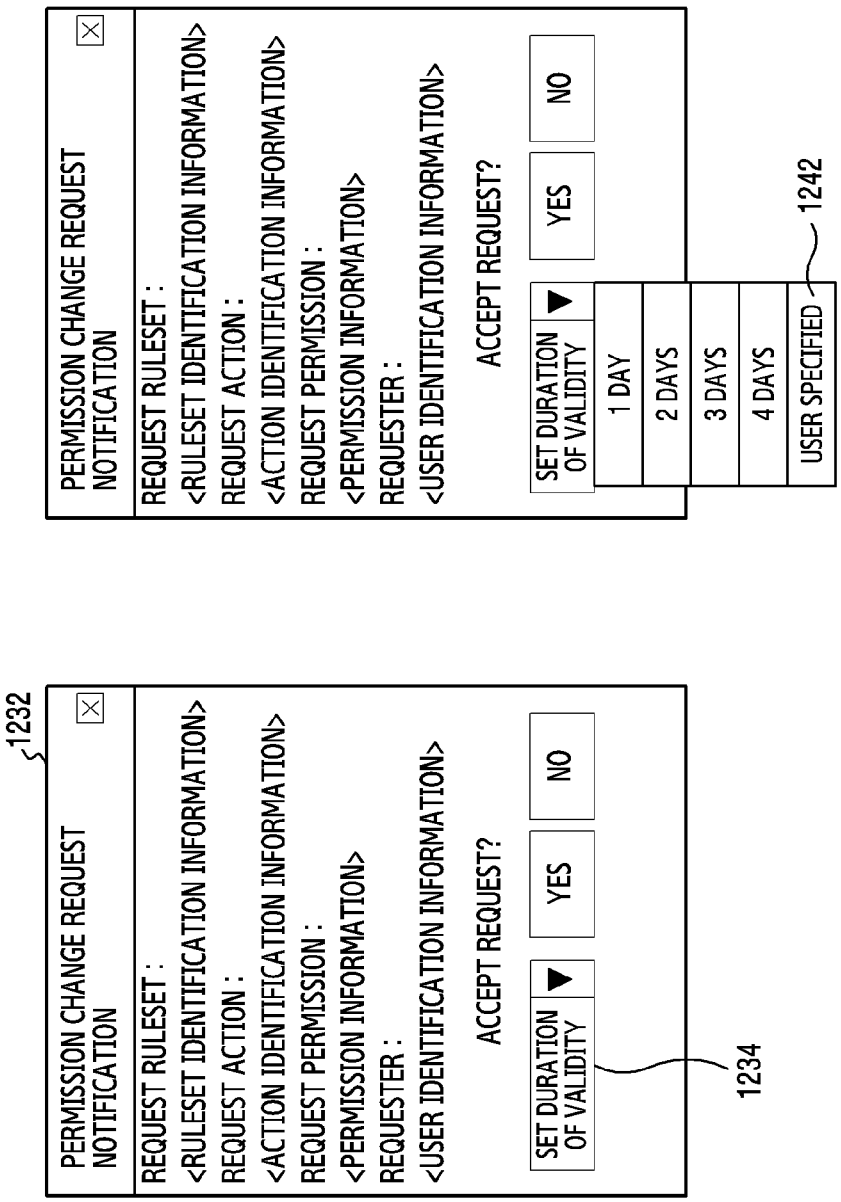
FIG. 12C illustrates an example of screens which inquire whether to accept a permission change in an electronic device according to various embodiments of the disclosure.

In operation 1203, the server 106 transmits a notification for the permission change request to the electronic device 102. That is, the electronic device 102 may receive request information regarding the permission change of the electronic device 101 from the server 106. Upon receiving the request information from the server 106, the electronic device 102 may display a screen for inquiring a creator of whether to approve this. In some embodiments, as shown in FIG. 12C, a pop-up window 1232 for inquiring whether the request is approved may be displayed on the display 160 of the electronic device 102. In the pop-up window 1232, a user of the electronic device 102 may select approval or rejection for the request of the permission change. The user of the electronic device 102 may select 'no' if the request of the permission change is rejected, and may select 'yes' if the request of the permission change is approved. In this case, a duration of validity for the permission change may be set at the same time of approval. For this, the user of the electronic device 102 may select an object 1234 for determining an additional duration of validity. Upon selecting the object 1234 for setting the duration of validity, a validity duration list 1242 may be displayed. Accordingly, the user may select a desired duration of validity, or if there is no desired duration of validity, may directly input it through a 'user input' region. If the duration of validity is set, the permission change is maintained only during the duration of validity, and if the duration of validity expires, the permission may be restored to a previous state of being changed. Otherwise, if the user of the electronic device 102 selects 'yes' without the setting of the duration of validity, a permission may be changed without a limitation in the duration of validity in the permission configuration of the ruleset.

In operation 1205, the electronic device 102 may transmit a response for the permission change request to the server 106. The electronic device 102 may transmit to the server 106 a message for reporting a creator's intention verified through the interface of FIG. 12C. In this embodiment, it is assumed that the permission change request is approved. According to an embodiment, the server 106 may change the permission by updating stored permission information of a user of the electronic device 101. Specifically, the server 106 may change content regarding the pre-stored permission. For example, if a request for modifying an action having only a reading permission is approved, the server 106 may consider the permission change for the electronic device 101 by excluding a limitation of a permission for modification and deletion of a pre-stored corresponding action. According to another embodiment, the server 106 may not update information regarding a permission owned by the user of the electronic device 101. For example, a process for the permission change in the server 106 may be complete by transmitting data (e.g., a token, a password for the permission change) required for the permission change to the electronic device 101.

Figure 12D:
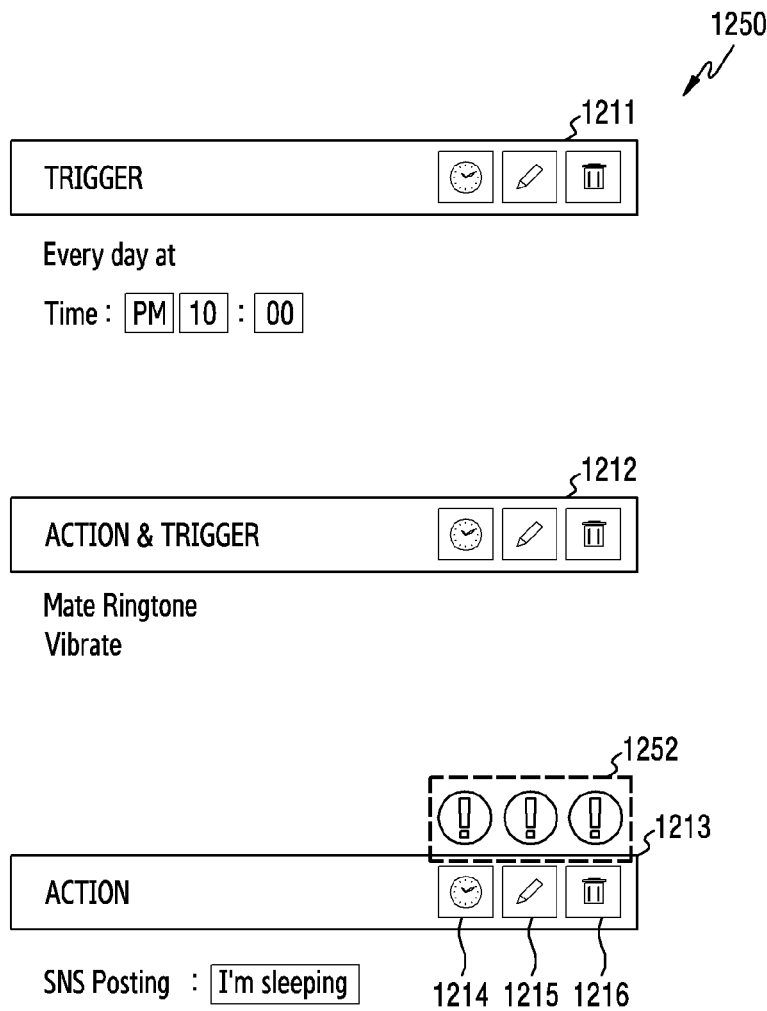
FIG. 12D illustrates an example of a screen which reports a result of a permission change in an electronic device according to various embodiments of the disclosure.

In operation 1207, the server 106 may transmit a permission change response to the electronic device 101. Accordingly, the electronic device 101 may display an additional pop-up to the display 160 according to approval response information received from the server 106. For example, as shown in a third screen 1250 of FIG. 12D, icons 1252 for reporting the permission change may be displayed on an upper end of the icons 1214 to 1216 for functions having the changed permission. For another example, the electronic device 101 may display content of the changed permission as a list. If a creator rejects the permission change, the electronic device 101 may display a pop-up window reporting that the permission change request has rejected on the display 160, or may not change the screen to express that there is no permission change.

As described with reference to FIG. 12A to FIG. 12D, a permission for processing (e.g., reading, modifying, deleting, or the like) of an action or trigger included in a ruleset may be limited, and a permission may be given by an approval of the creator. Accordingly, since it becomes difficult for the user to change the ruleset indiscriminately, it is possible to protect rights of the creator. Further, when the ruleset is distributed in a state of being created, there may be an advertising effect for the creator. Furthermore, in the presence of an action for advertisement among actions of the ruleset, there is a limitation in modification or deletion of an action for advertisement by limiting the permission, thereby also having an advertising effect.

In the embodiment described with reference to FIG. 12C, the screen may include the object 1234 for setting the duration of validity. Accordingly, the user of the electronic device 102 may set the duration of validity for the permission change, or may change the permission without the duration of validity. According to another embodiment, the object 1234 for setting the duration of validity may be excluded from the screen. In this case, a process of approving the permission change may not include the procedure for setting the duration of validity.

The ruleset according to various embodiments of the disclosure may include actions executed by a plurality of devices, instead of being constructed of only actions executed by one device. Hereinafter, embodiments related to the ruleset associated with the plurality of devices will be described.

Figure 13A:
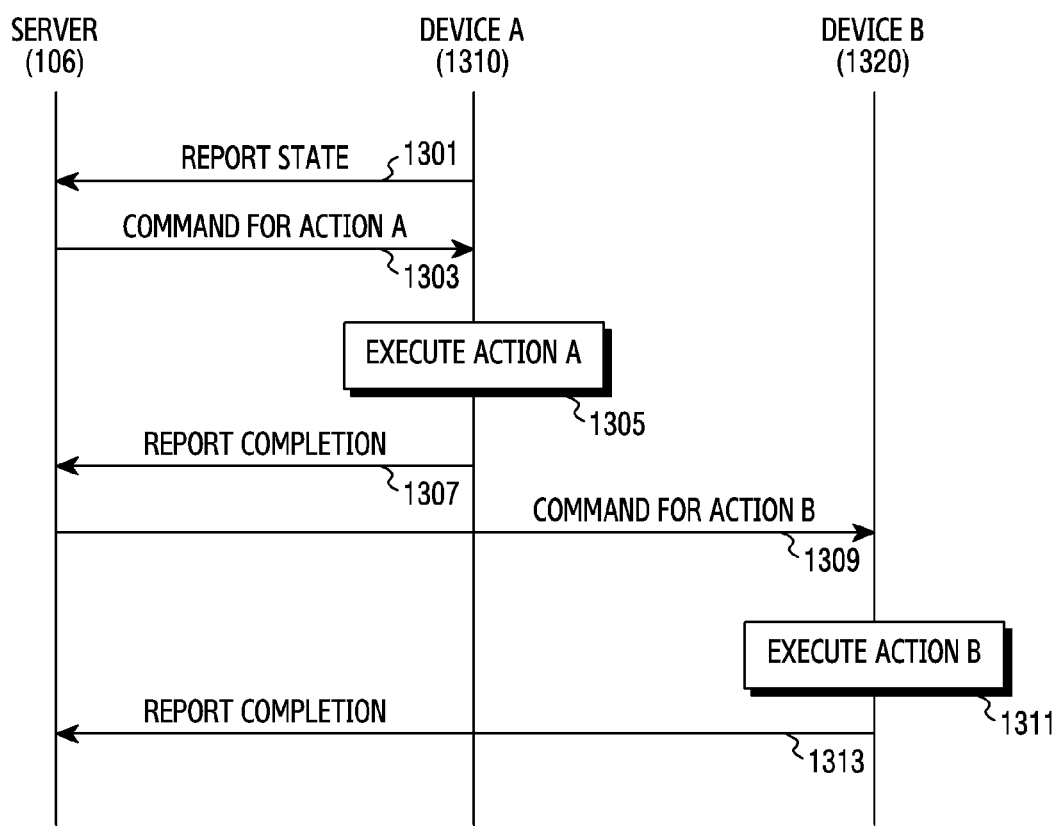
FIG. 13A illustrates a signal exchange for executing a ruleset associated with a plurality of devices according to various embodiments of the disclosure.

FIG. 13A illustrates a signal exchange for executing a ruleset associated with a plurality of devices according to various embodiments of the disclosure. A signal exchange for consecutive actions of a device A 1310 and a device B 1320 is exemplified in FIG. 13A.

Referring to FIG. 13A, in operation 1301, the device A 1310 may transmit state information to the server 106. The state information may be transmitted in an event driven manner or may be transmitted cyclically. A transmission cycle of the state information may be determined by a user. If the cycle is short, the server may be overloaded due to excessive information reception, and if the cycle is long, a response may be late or a trigger may be lost even if the trigger occurs. Therefore, a user preferably selects any transmission cycle suitable for an operating environment. By receiving the state information, the server 106 may determine whether the trigger occurs. According to an embodiment, the device A 1310 may be a front door 1312 of FIG. 13B. The front door 1312 may recognize door open or close information through a sensor. The front door 1312 may transmit, to the server 106, state information indicating closing during the door is closed, and may transmit state information indicating opening during the door is open. Since an opening trigger does not occur during the information indicating closing is received from the front door 1312, the server 106 may do not perform any operation. When the user opens the door to enter, the first door 1312 may transmit the state information indicating opening to the server 106, and the server 106 may determine that the trigger occurs. According to another embodiment, the device A 1310 may be a blind 1314 of FIG. 13C. The blind 1314 may measure brightness of a hospital room through an illumination sensor. In this case, the state information may include an illumination value. Therefore, the server 106 may determine that the trigger occurs, when state information indicating a lux value received from the blind 1314 indicates a value less than any brightness.

Figure 13B:
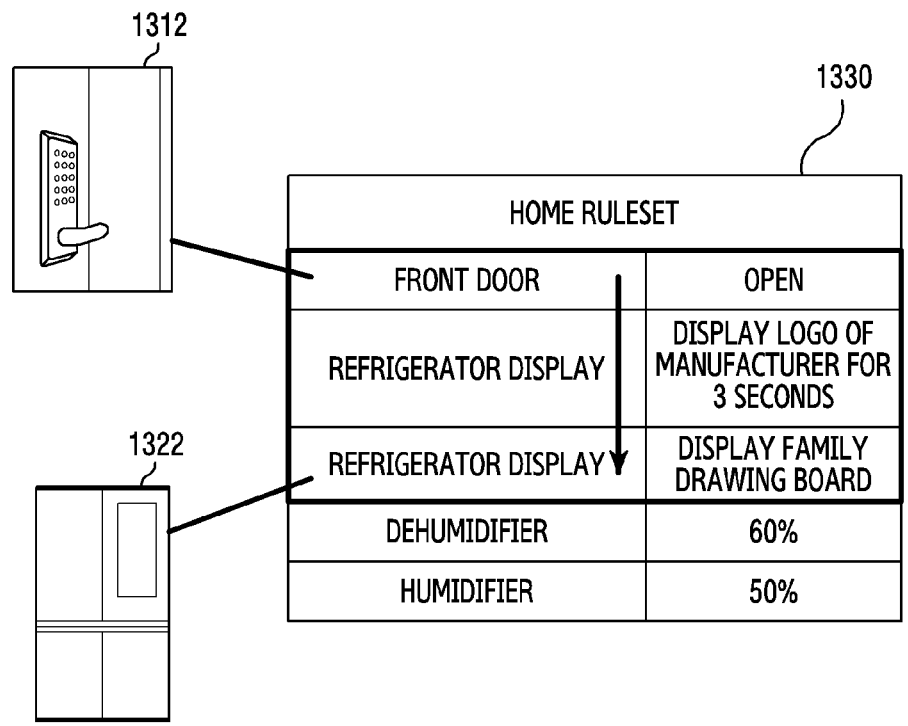
FIGS. 13B and 13C illustrate example rulesets associated with a plurality of devices according to various embodiments of the disclosure.

In operation 1303, the server 106 may transmit a command for an action A to the device A 1310. In other words, the server 106 may determine the trigger occurrence on the basis of the state information received from the device A 1310, and may provide control to execute the action A on the basis of the trigger by transmitting information regarding the action A. In case of no trigger occurrence, the server 106 may not transmit any information to the device A 1310. However, in case of being used only as the trigger as in the first door 1312 of FIG. 13B, operation 1307 may be skipped. However, any other embodiments may be possible within a range which does not limit the scope of the disclosure. For example, the action A may include content of changing a door lock of the front door 1312 from automatic to manual. For another example, as shown in FIG. 13B, the action A may include content of displaying a logo of a manufacturer on a display of a refrigerator 1322 for 3 seconds. For another example, in another embodiment according to FIG. 13C, the action A may include content of allowing the blind 1314 to have intermediate brightness. That is, when an illumination measured in the hospital room is less than or equal to a specific lux value which can be determined as being dark, the action A may include content of allowing the blind 1314 to have the intermediate brightness.

In operation 1305, the device A 1310 may execute the action A. In other words, the device A 1310 may receive information regarding the action A, and may perform a corresponding operation. For example, as shown in FIG. 13B, according to action information received from the server 106, the refrigerator 1322 may display the logo of the manufacturer on the display for 3 seconds. In addition, in another embodiment shown in FIG. 13C, according to action information received from the server 106, the blind 1314 may perform a motion function in a downward direction, or may operate to change the brightness of the hospital room to the intermediate brightness through other functions.

In operation 1307, the device A 1310 may transmit a completion report message to the server 106. By transmitting the completion report message, it may be reported to the server 106 that information regarding the action A has been successfully received from the device A 1310 and the action A has been performed. For example, as shown in FIG. 13B, the refrigerator 1322 may display the logo on the display for 3 seconds, and may transmit a completion report message based thereon to the server 106. In addition, in another embodiment according to FIG. 13C, the blind 1314 may control the brightness, and may transmit a completion report message based thereon to the server 106.

In operation 1309, the server 106 may transmit a command for an action B to the device B 1320. That is, the server 106 may verify the execution of the action A which corresponds to an action and a trigger, upon receiving the completion report message from the device A 1310 in the previous operation. Accordingly, the server 106 may instruct to execute the action B, by transmitting information regarding the action B. For example, as shown in FIG. 13B, the device B 1320 may be the refrigerator 1322. The server 106 may know that the action A which displays the logo will be performed upon receiving the completion report message from the refrigerator 1322, and thus may transmit information of an action which displays a family drawing board. For another example, in another embodiment according to FIG. 13C, the device B 1320 may be a light bulb 1324. The server 106 may receive the completion report message from the blind 1314, and thus may instruct the light bulb 1324 to execute the action B.

In operation 1311, the device B 1320 may execute the action B. That is, the device B 1320 may receive information regarding the action B, and may perform a corresponding operation. For example, as shown in FIG. 13B, the refrigerator 1322 may perform an operation of displaying a family drawing board. For another example, in another embodiment according to FIG. 13C, the light bulb 1324 may perform an operation of emitting warm light with intermediate brightness.

In operation 1313, the device B 1320 may transmit the completion report message to the server 106. By transmitting the completion report message, it may be determined that the action B has been performed in the device B 1320 via the server 106. For example, in an embodiment according to FIG. 13B, the refrigerator 1322 may transmit the completion report message to the server 106. For another example, in another embodiment according to FIG. 13C, the light bulb 1324 may transmit the completion report message to the server 106.

Figure 13C:
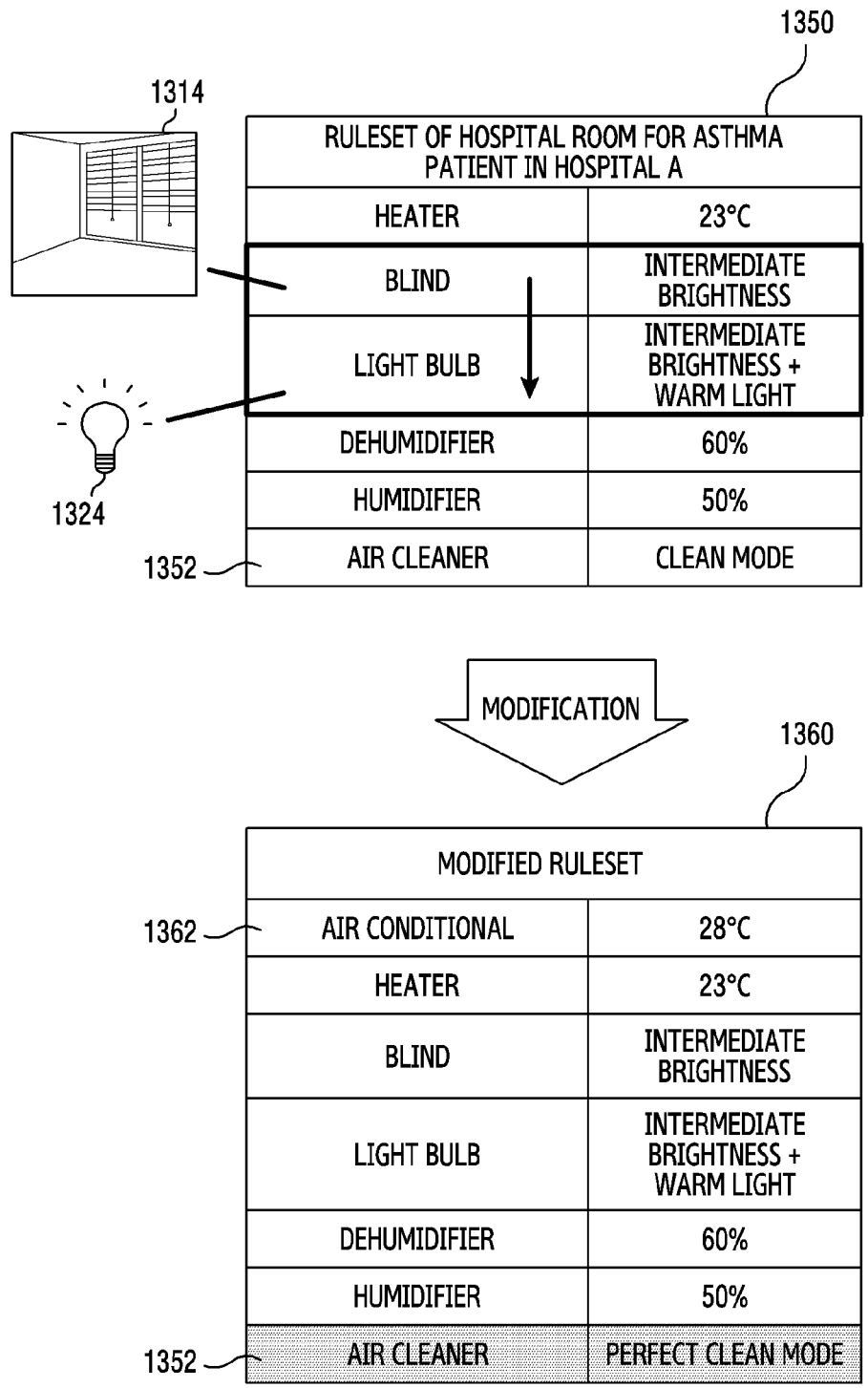

As described with reference to FIG. 13A to FIG. 13C, consecutive connector services associated with a plurality of devices may be provided. For this, as a preliminary operation, information regarding devices for performing actions for the consecutive connector services may be provided to the server 106. In other words, the electronic device 101 may transmit a device list to the server 106. Accordingly, the server 106 may recognize devices belonging to a network to which a rule will be applied. Herein, the device list may include at least one of identification information of each device, a device type, and an address (e.g., an IP address) for communication. Accordingly, the devices and the server 106 may be in a state in which communication can be performed with each other. The electronic device 101 may transmit the device list to the server 106 during a procedure of registering an account, during a procedure of receiving a ruleset, or when an event occurs (e.g., when there is a change in information regarding devices). The device list may be provided once or twice. For example, when the device list is transmitted again after the device list is transmitted during the procedure of registering the account, the device list transmitted again may have a meaning of verifying validity of the device list.

As described with reference to FIG. 13A to FIG. 13C, consecutive connector services associated with a plurality of devices may be provided. In this case, similarly to the aforementioned procedure of modifying the ruleset, the ruleset associated with the plurality of devices may be modified. For example, referring to FIG. 13C, according to a ruleset 1350 of a hospital A, a heater is configured to operate when a temperature of a hospital room is less than or equal to 23 degrees Celsius. Thus, the user may modify the ruleset 1350 similarly to a modified ruleset 1360 so that it is optimized for an environment for applying the ruleset. Specifically, the electronic device 101 may add an action of an air conditioner 1362. Accordingly, the modified ruleset 1360 may provide control such that the temperature of the hospital room always remains in 23 to 28 degrees Celsius. In addition, the electronic device 101 may modify an action of an air cleaner 1352 of the ruleset 1350 to an action having content from a 'clean mode' to a 'perfect clean mode'. Accordingly, a hospital room of an asthma patient can be maintained to have more fresh air.

Further, according to other embodiments, the electronic device 101 may change a permission of an action or trigger. For example, in the hospital room of the asthma patient, quality of the air may be a factor directly sensitive to the life. Accordingly, in order to increase safety, the electronic device 101 may be capable of changing a permission of a ruleset which blocks modification and deletion of an action of the air cleaner 1352.

Figure 14A:
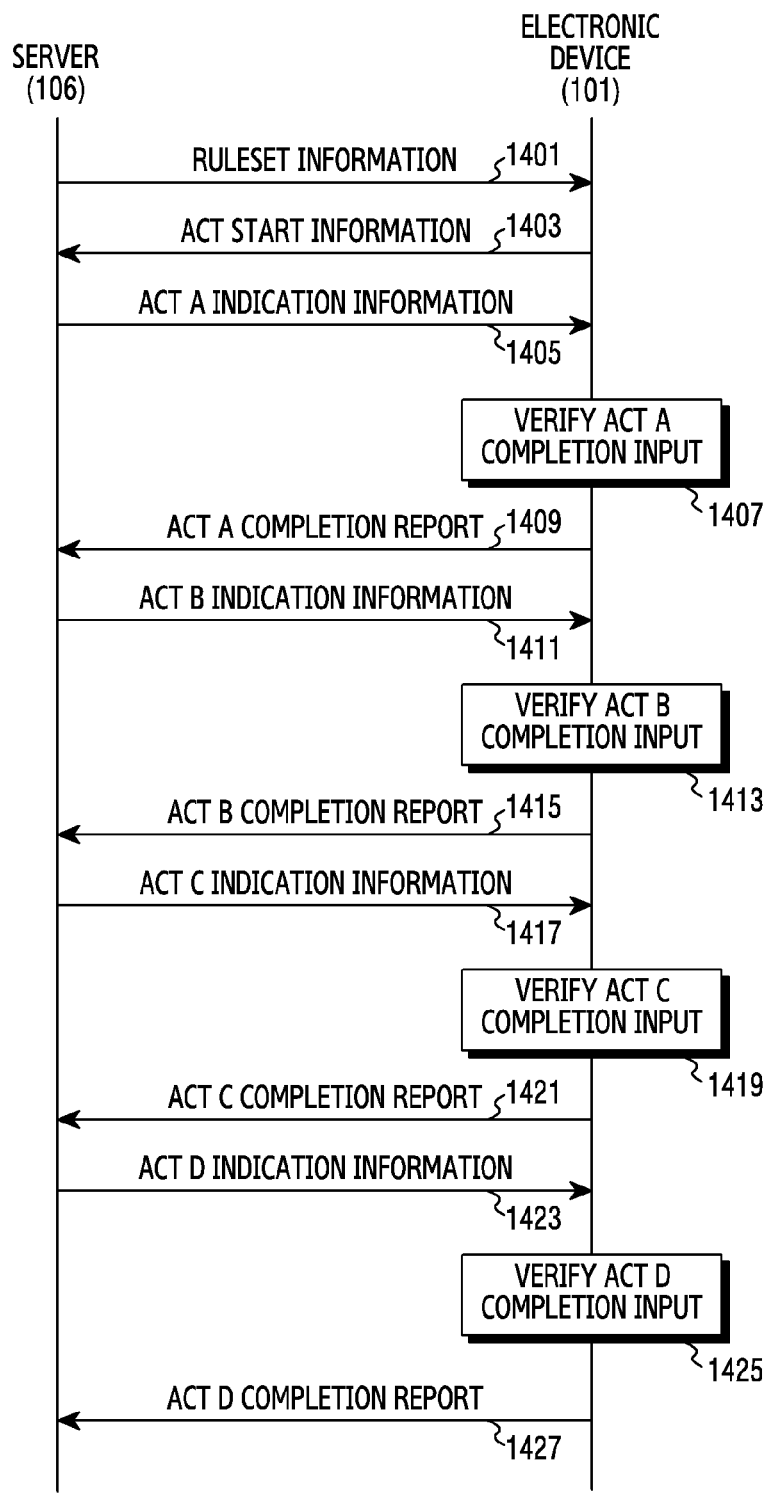
FIG. 14A illustrates a signal exchange for controlling consecutive actions based on a user's act in an electronic device according to various embodiments of the disclosure.

FIG. 14A illustrates a signal exchange for controlling consecutive actions based on a user's act in an electronic device according to various embodiments of the disclosure. A signal exchange between the electronic device 101 and the server 106 according to a user's act is exemplified in FIG. 14A.

Referring to FIG. 14A, in operation 1401, the electronic device 101 may receive ruleset information from the server 106. The electronic device 101 may have access to a site or execute an application, and may select a ruleset to be used. The server 106 may transmit the ruleset information based on a user's selection to the electronic device 101. For example, as shown in FIG. 14B, the ruleset may include a ruleset 1410 for an exercise or a ruleset 1420 for a diet.

In operation 1403, the electronic device 101 may transmit act start information to the server 106. Since it is a consecutive operation based on a user's act, start information of a first act may be required to be input by the user. The act start information may be generated by selecting a specific object on a screen displayed on a display of the electronic device 101. When the ruleset 1410 for the exercise or the ruleset 1420 for the diet are used as shown in FIG. 14B, an object having a meaning such as 'exercise start' or 'diet start' or the like may be used.

In operation 1405, the server 106 may transmit information indicating an act A to the electronic device 101. That is, the server 106 may determine that a trigger has occurred upon receiving user's start information. Therefore, the server 106 may transmit information regarding the act A to the electronic device 101 of the user, and may allow the user to start the act A. For example, as shown in FIG. 14B, the act A may be repetition of 3 sets of an exercise 1. In this case, the electronic device 101 may display 'repetition of 3 sets of the exercise 1' on the display 160.

In operation 1407, the electronic device 101 may verify an input for completion of the user's act A. Since an action is defined as a user's act, the electronic device 101 cannot directly know the completion of the act A. Therefore, the user may input the complete of the act A to the electronic device 101, and the electronic device 101 may verify the completion. However, according to another embodiment, the electronic device 101 may determine the completion of the user's act A by using at least one sensor such as a camera or the like. In this case, operation 1407 may be replaced with an operation of detecting the completion of the act A.

In operation 1409, the electronic device 101 may transmit a completion report message of the act A to the server 106. The input of the completion of the user's act A may be received by the electronic device 101, and may not be received by the server 106. Therefore, the electronic device 101 may allow the server 106 to determine whether a trigger occurs, by transmitting the completion report message to the server 106.

In operation 1411, the server 106 may transmit information indicating an act B to the electronic device 101. That is, the server 106 may determine that the trigger has occurred upon receiving the completion report message of the user's act A. Therefore, the server 106 may transmit information on the act B of the electronic device 101 of the user, and may allow the user to start the act B. For example, as shown in FIG. 14B, the act B may be a one-minute break. In this case, the electronic device 101 may display 'one-minute break' on the display 160.

In operation 1413, the electronic device 101 may verify an input for completion of the user's act B. The user may complete the act B, and may input complete information of the act B to the electronic device 101. Thus, the electronic device 101 may verify the completion of the act B. In the embodiment according to FIG. 14B, the electronic device 101 may display an object (e.g., a button) for the input of the completion on the display 160, and may receive the user's input.

In operation 1415, the electronic device 101 may transmit the completion information of the act B to the server 106. That is, since the electronic device 101 only receives the input for completion information of the user's act B, the electronic device 101 may allow the server 106 to determine whether a trigger has occurred by transmitting again the received completion input to the server 106.

In operation 1417, the server 106 may transmit information indicating an act C to the electronic device 101. That is, completion information of the act B may be a trigger of the act C, and information regarding the act C may be transmitted to the electronic device 101. For example, as shown in FIG. 14B, the act C may be repetition of 3 sets of an exercise 2. In this case, the electronic device 101 may display 'repetition of the 3 sets of the exercise 2' on the display 160.

In operation 1419, the electronic device 101 may verify the completion of the user's act C. The user may input the completion of the act C to the electronic device 101, and if there is a completion input based thereon, the electronic device 101 may verify the completion of the act C.

In operation 1421, the electronic device 101 may transmit a completion report message of the act C to the server 106. That is, the electronic device 101 only receives the user's completion input, and the server 106 may determine whether a trigger has occurred by transmitting the received completion input to the server 106.

In operation 1423, the server 106 may transmit information indicating an act D to the electronic device 101. That is, this may be a case where the completion of the act C is a trigger of the act D. Therefore, the server 106 may transmit information regarding the act D and control the electronic device 101 such that content of the act D is displayed on the display 160. Thus, the user can execute the act D. For example, as shown in FIG. 14B, the act D may be a one-minute break.

In operation 1425, the electronic device 101 may verify a completion input of the user. The user may input the completion of the one-minute break to the electronic device 101. Therefore, the electronic device 101 may verify the completion of the one-minute break.

In operation 1427, the electronic device 101 may transmit a completion report message of the act D to the server 106. Since the electronic device 101 only receives the completion input of the user, the server 106 may determine whether a trigger has occurred by transmitting the received completion input to the server 106.

Figure 15A:
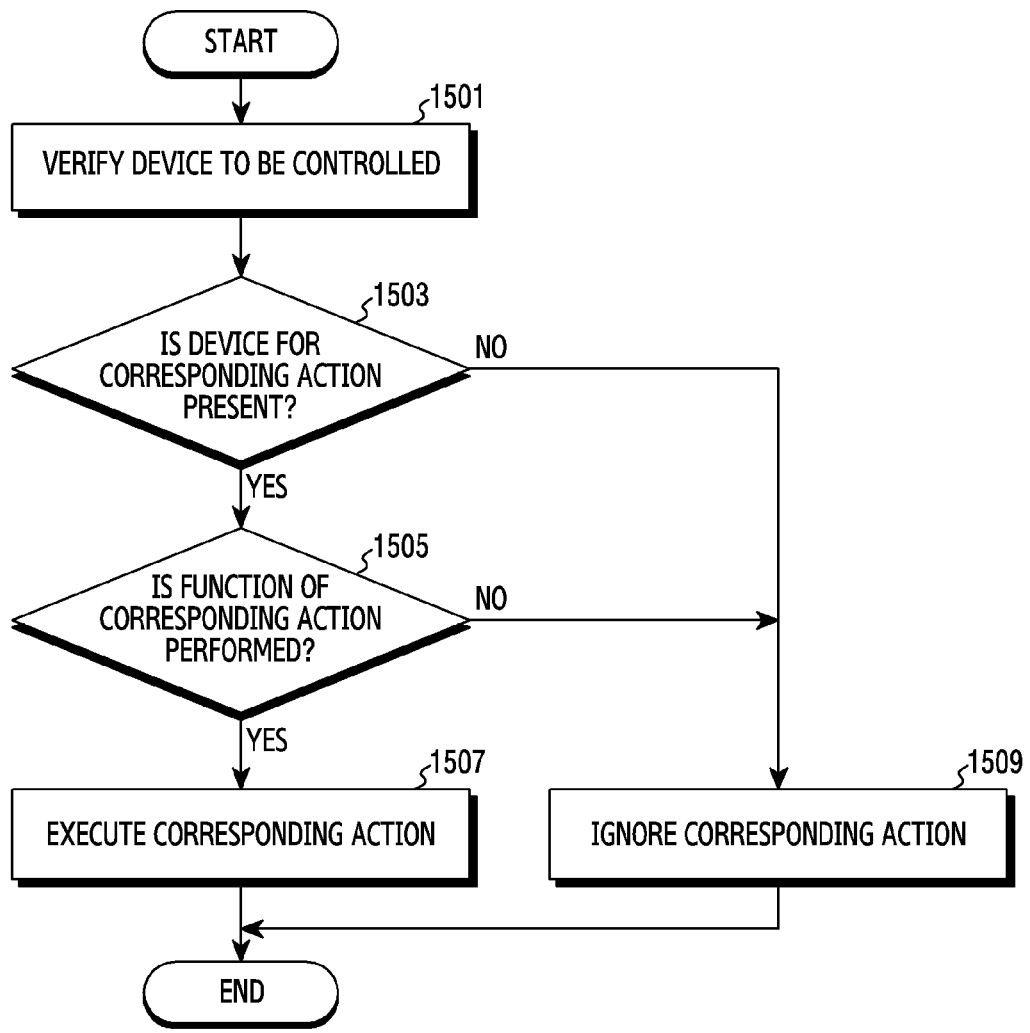
FIG. 15A is a flowchart for controlling an action based on whether a device exists in a server according to various embodiments of the disclosure.

FIG. 15A is a flowchart for controlling an action based on whether a device exists in a server according to various embodiments of the disclosure. A method of operating the server 106 is exemplified in FIG. 15A. Specifically, FIG. 15A exemplifies a method of ignoring a corresponding action when there is no device for a specific action.

Figure 15B:
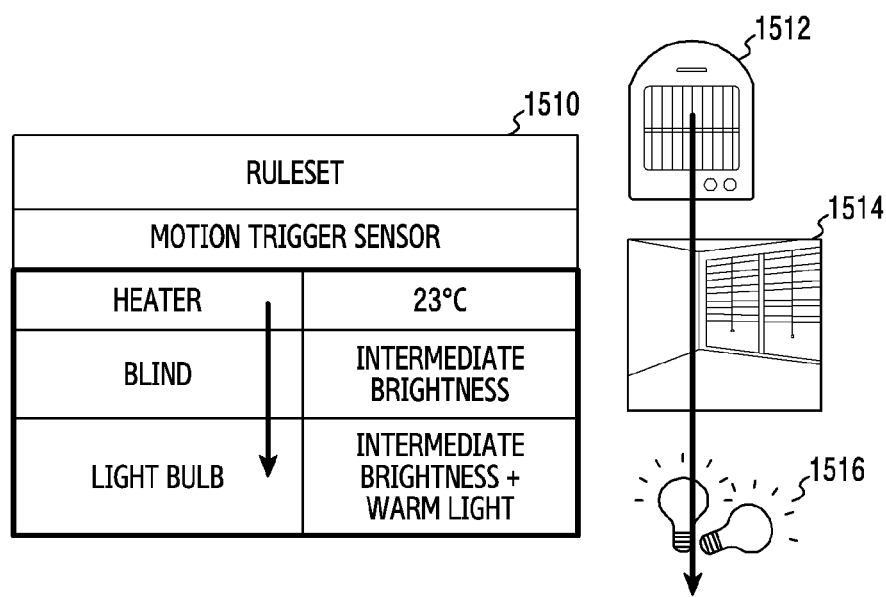
FIG. 15B illustrates an example of an environment where all devices required to execute a ruleset is present according to various embodiments of the disclosure.
Figure 15C:
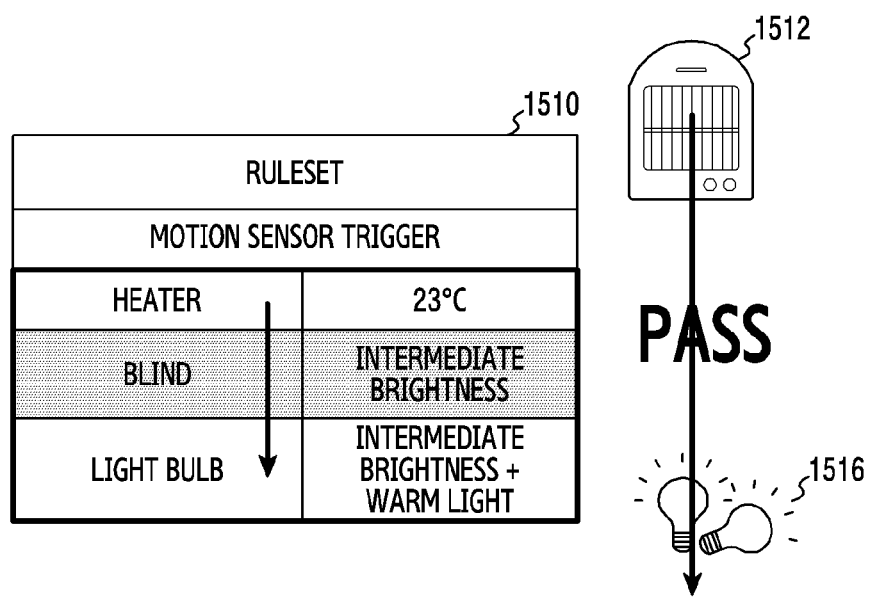
FIG. 15C illustrates an example of an environment where some devices required to execute a ruleset are not present according to various embodiments of the disclosure.

Referring to FIG. 15A, in operation 1501, the server 106 may verify a device to be controlled to perform a corresponding action. That is, the server 106 may control consecutive actions associated with different devices, and may verify which type of a device is used to execute an action to be performed next. That is, the server 106 may verify which device is used to perform a specific action. For example, when using a ruleset 1510 as shown in FIG. 15B and FIG. 15C, if an action in which a heater 1512 is set to a temperature of 23 degrees Celsius is performed, an action for controlling a blind 1514 to intermediate brightness may be triggered as a next action. In this case, the server 106 may verify the blind 1512 as a device to be controlled.

Thereafter, in operation 1503, the server 106 may verify whether there is a device for performing a corresponding action. Upon downloading the ruleset from the server 106 or registering an account, the electronic device 101 may transmit information of devices belonging to networks, to which the ruleset is applied, to the server 106. Therefore, the server 106 may have information of the devices, and may determine whether there is a required device. For example, a device list received by the server 106 from the electronic device 101 and a type of a device for performing a corresponding action may be compared. The comparison may be possible since information regarding a type of a device required in the execution of the ruleset is pre-stored in the server and the list information of the user's device is received when the ruleset is downloaded. For example, the blind 1514 exists in case of an environment of FIG. 15B. However, in case of an environment of FIG. 15C, the blind 1514 does not exist. As shown in FIG. 15B, there may be no problem when the blind 1514 exists. However, as shown in FIG. 15C, in the absence of the device, if it is not controlled to perform a next action by ignoring this, a situation where the execution of the ruleset stops may occur due to the absence of the device. Therefore, operation 1509 may be performed as follows for a case where there is no device for performing a corresponding action.

In the presence of the device, in operation 1506, the server 106 may determine whether the device is capable of performing a function of a corresponding action. For example, in case of FIG. 15B, although brightness control of the blind 1514 is included in content of the action, the blind 1514 may not support the brightness control. In this case, similarly to a case where the device does not exist, a situation where the execution of the ruleset stops may occur. Therefore, operation 1509 may be performed as follows for a case where the device does not support a function required to execute a corresponding action.

When the function of the corresponding action can be performed, in operation 1507, the server 106 may control the device to execute the corresponding action. That is, the server 106 may determine that the device for performing the corresponding action exists and supports a function required to execute the action, and may control the device. If the device exists and supports the function, there is no problem in performing a corresponding action, and there is no case where the ruleset itself does not operate but stops, the server 106 may control the device to perform an action of content designated content. For example, as shown in FIG. 15B, the ruleset is triggered by a motion sensor, and an action of the heater 1512 is executed, thereby requiring an action of the blind 1514. In this case, since the blind 1514 exists and supports a brightness control function, the action of the blind 1514 may be executed.

In operation 1509, the server 106 may ignore a corresponding action. That is, the server 106 may skip the action and proceed to a next action. That is, the server 106 may provide control to execute the next action under the assumption that an action has been performed for a case where there is no device or there a device exists but does not support a corresponding function. In order to avoid a situation where the execution of the ruleset stops since a specific action cannot be performed, subsequent consecutive actions may be executed by ignoring the action. Specifically, if there is no device for a corresponding action, the server 106 may ignore the action. In addition, if there is a device for the action but a function required for the action is not supported, the server 106 may ignore the action. For example, as shown in FIG. 15C, if the blind 1514 does not exist, the server 106 may skip the action and may provide control to execute a next action, i.e., an action of a light bulb 1516. In addition, even if the blind 1514 exists but does not support the brightness control function according to a specific embodiment, the server 106 may provide control to execute a next action, i.e., an action of the light bulb 1516.

According to the aforementioned various embodiments, a connector service using conditional actions executed consecutively may be provided. In the aforementioned embodiments, a device (e.g., the electronic device 102) which accepts a permission change and a device (e.g., the server 106) which manages a ruleset have been described as separate devices. However, according to another embodiment, the device which generates the ruleset and the device which manages the ruleset may be the same device. In addition, the device which accepts the permission change of the ruleset and the device which manages the ruleset may be the same device. For example, the electronic device 102 of the creator may perform the function of the server 106. In this case, in the aforementioned embodiments, a signal exchange between the electronic device 102 and the server 106 may be understood as a signal exchange inside the electronic device 102, and a signal exchange between the server 106 and the electronic device 101 may be understood as a signal exchange between the electronic device 102 and the electronic device 101. Specifically, functions of the server 016 may be performed by the electronic device 102, and in this case, a procedure of sharing a ruleset may be performed as shown in FIG. 16, and consecutive connector services may be performed as shown in FIG. 17.

Figure 16:
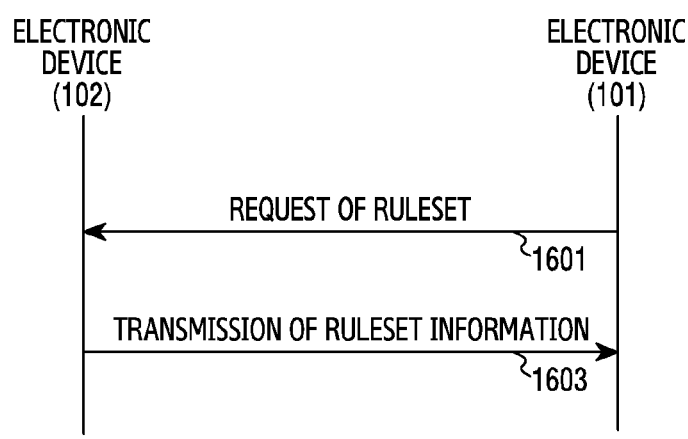
FIG. 16 is a flowchart for requesting and downloading a ruleset between electronic devices according to various embodiments of the disclosure.
Figure 17:
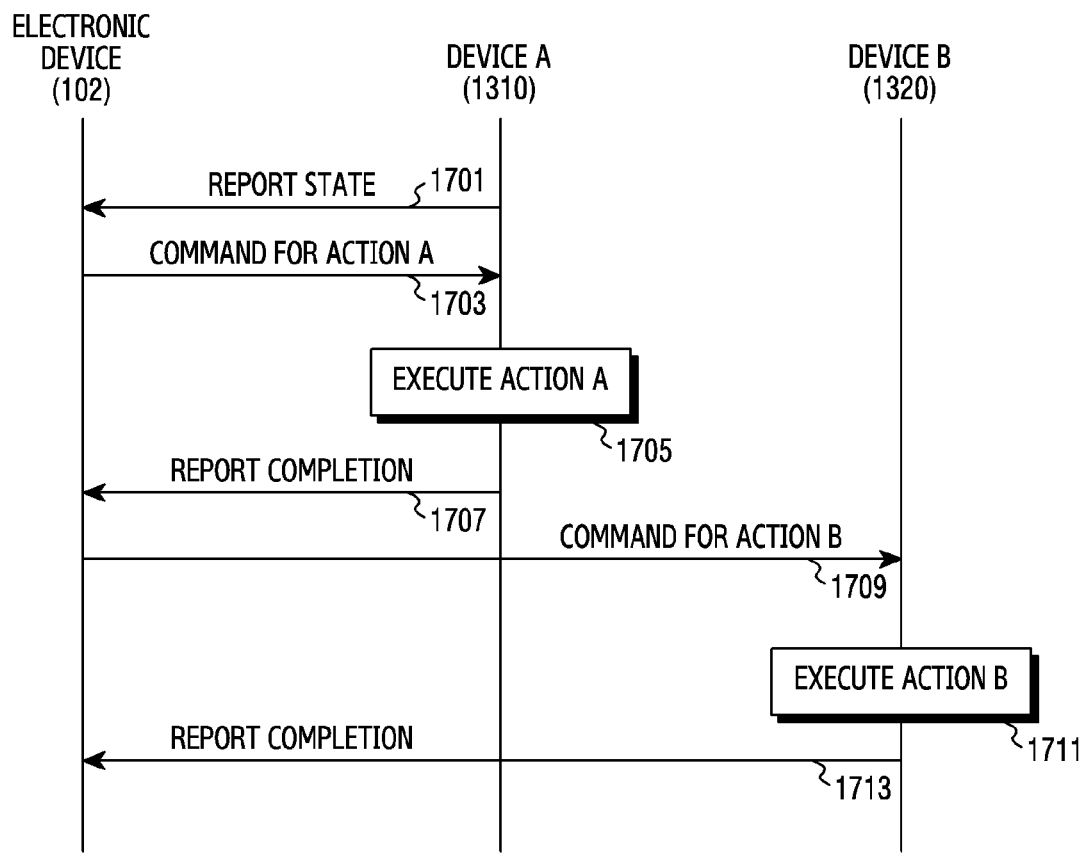
FIG. 17 illustrates another signal exchange for executing a ruleset associated with a plurality of devices according to various embodiments of the disclosure.

FIG. 16 is a flowchart for requesting and downloading a ruleset between electronic devices according to various embodiments of the disclosure. A method of operating the electronic devices 101 and 102 is exemplified in FIG. 16. Specifically, FIG. 16 exemplifies downloading of a ruleset of the electronic device 102 which may be the server 106 and the electronic device 101 of a user.

Referring to FIG. 16, in operation 1601, the electronic device 101 may transmit to the electronic device 102 a request for a ruleset to be downloaded. That is, through a ruleset list received from the electronic device 102, the electronic device 101 may select a ruleset to be used and, for the selected ruleset, may request the electronic device 102 to provide ruleset information. Before this, although not shown in FIG. 16, the electronic device 101 may have access to or log in the electronic device 102. The electronic device 101 which requests for the access may require a login procedure or the like through a user's account. In the login procedure of the electronic device 101, the electronic device 102 may store account information or the like of the electronic device 101. In addition, the electronic device 101 may input a list of devices coupled to the electronic device 101 together with the login. The electronic device 102 which may be the server 106 may transmit information of a ruleset stored in the logged-in electronic device 101. That is, since the electronic device 102 may have a plurality of rulesets stored therein due to uploading of ruleset creators, a list of rulesets may be transmitted to the electronic device 101 to select a ruleset to be used.

In operation 1603, the electronic device 102 may transmit information regarding the requested ruleset to the electronic device 101. In other words, the electronic device 102 may specify which ruleset is the ruleset requested by the electronic device 101 specifically through the received ruleset request information, and may allow the user of the electronic device 101 to use the ruleset by transmitting information regarding the requested ruleset to the electronic device 101.

FIG. 17 illustrates another signal exchange for executing a ruleset associated with a plurality of devices according to various embodiments of the disclosure. A signal exchange for consecutive actions of the device A 1310 and the device B 1320 is exemplified in FIG. 17. In the example of FIG. 17, the electronic device 102 may be the server 106. That is, the electronic device 102 may store information regarding a ruleset selected by a user of the ruleset and may play a role of the server 106. For example, as shown in FIG. 13B or FIG. 13C, the ruleset information stored in the electronic device 102 may be a home ruleset 1330 applicable in a home network and a hospital room ruleset 1350 applicable in a hospital.

Referring to FIG. 17, in operation 1701, the device A 1310 may transmit state information to the electronic device 102. The state information may be transmitted in an event driven manner or may be transmitted cyclically. A transmission cycle of the state information may be determined by a user. If the cycle is short, the server may be overloaded due to excessive information reception, and if the cycle is long, a response may be late or a trigger may be lost even if the trigger occurs. Therefore, a user preferably selects any transmission cycle suitable for an operating environment. By receiving the state information, the electronic device 102 may determine whether the trigger occurs. According to an embodiment, the device A 1310 may be the front door 1312 of FIG. 13B. The front door 1312 may recognize door open or close information through a sensor. The front door 1312 may transmit, to the server 106, state information indicating closing during the door is closed, and may transmit state information indicating opening during the door is open. Since an opening trigger does not occur during the information indicating closing is received from the front door 1312, the electronic device 102 may do not perform any operation. When the user opens the door to enter, the first door 1312 may transmit the state information indicating opening to the electronic device 102, and the electronic device 102 may determine that the trigger occurs. Herein, the electronic device 102 may determine whether a trigger occurs on the basis of self-stored ruleset information. According to another embodiment, the device A 1310 may be the blind 1314 of FIG. 13C. The blind 1314 may measure brightness of a hospital room through an illumination sensor. In this case, the state information may include an illumination value. Therefore, the electronic device 102 may determine that the trigger occurs, when state information indicating a lux value received from the blind 1314 indicates a value less than any brightness.

In operation 1703, the electronic device 102 may transmit a command for an action A to the device A 1310. In other words, the electronic device 102 may determine the trigger occurrence on the basis of the state information received from the device A 1310, and may provide control to execute the action A on the basis of the trigger by transmitting information regarding the action A. In case of no trigger occurrence, the electronic device 102 may not transmit any information to the device A 1310. However, in case of being used only as the trigger as in the first door 1312 of FIG. 13B, operation 1303 may be skipped. However, any other embodiments may be possible within a range which does not limit the scope of the disclosure. For example, the action A may include content of changing a door lock of the front door 1312 from automatic to manual. For another example, as shown in FIG. 13B, the action A may include content of displaying a logo of a manufacturer on a display of the refrigerator 1322 for 3 seconds. Alternatively, according to contention of the created ruleset, content for displaying a logo of another competitor other than the manufacturer may be included. For another example, in another embodiment according to FIG. 13C, the action A may include content of allowing the blind 1314 to have intermediate brightness. That is, when an illumination measured in the hospital room is less than or equal to a specific lux value which can be determined as being dark, the action A may include content of allowing the blind 1314 to have the intermediate brightness.

In operation 1705, the device A 1310 may execute the action A. In other words, the device A 1310 may receive information regarding the action A, and may perform a corresponding operation. For example, as shown in FIG. 13B, according to action information received from the electronic device 102, the refrigerator 1322 may display the logo of the manufacturer on the display for 3 seconds. In addition, in another embodiment shown in FIG. 13C, according to action information received from the electronic device 102, the blind 1314 may perform a motion function in a downward direction, or may operate to change the brightness of the hospital room to the intermediate brightness through other functions.

In operation 1707, the device A 1310 may transmit a completion report message to the electronic device 102. By transmitting the completion report message, it may be reported to the electronic device 102 that information regarding the action A has been successfully received from the device A 1310 and the action A has been performed. For example, as shown in FIG. 13B, the refrigerator 1322 may display the logo on the display for 3 seconds, and may transmit a completion report message based thereon to the electronic device 102. In addition, in another embodiment according to FIG. 13C, the blind 1314 may control the brightness, and may transmit a completion report message based thereon to the electronic device 102.

In operation 1709, the electronic device 102 may transmit a command for an action B to the device B 1320. That is, the electronic device 102 may verify the execution of the action A which corresponds to an action and a trigger, upon receiving the completion report message from the device A 1310 in the previous operation. Accordingly, the electronic device 102 may instruct to execute the action B, by transmitting information regarding the action B. For example, as shown in FIG. 13B, the device B 1320 may be the refrigerator 1322. The electronic device 102 may know that the action A which displays the logo will be performed upon receiving the completion report message from the refrigerator 1322, and thus may transmit information of an action which displays a family drawing board. For another example, in another embodiment according to FIG. 13C, the device B 1320 may be the light bulb 1324. The electronic device 102 may receive the completion report message from the blind 1314, and thus may instruct the light bulb 1324 to execute the action B.

In operation 1711, the device B 1320 may execute the action B. That is, the device B 1320 may receive information regarding the action B, and may perform a corresponding operation. For example, as shown in FIG. 13B, the refrigerator 1322 may perform an operation of displaying a family drawing board. For another example, in another embodiment according to FIG. 13C, the light bulb 1324 may perform an operation of emitting warm light with intermediate brightness.

In operation 1713, the device B 1320 may transmit the completion report message to the electronic device 102. By transmitting the completion report message, the electronic device 102 may determine that the action B has been performed in the device B 1320. For example, in an embodiment according to FIG. 13B, the refrigerator 1322 may transmit the completion report message to the electronic device 102. For another example, in another embodiment according to FIG. 13C, the light bulb 1324 may transmit the completion report message to the server 106.

A term "module" used in the document includes a unit consisting of hardware, software, or firmware, and may be interchangeably used with a term such as a unit, a logic, a logical block, a component, a circuit, and the like. The "module" may be an integrally constructed component or a minimum unit or one part thereof for performing one or more functions. The "module" may be mechanically or electrically implemented, and may include, for example, an Application-Specific Integrated Circuit (ASIC) chip, a Field-Programmable Gate Arrays (FPGAs), or a programmable-logic device, which is known or to be developed to perform certain operations. At least part of an apparatus (e.g., modules or functions thereof) or method (e.g., operations) according to various exemplary embodiments may be implemented with an instruction stored in a computer-readable storage media (e.g., the memory 130). If the instruction is executed by one or more processors (e.g., the processor 120), the one or more processors may perform a function corresponding to the instruction. The computer-readable storage media may include a hard disk, a floppy disk, magnetic media (e.g., a magnetic tape), optical media (e.g., a Compact Disc-ROM (CD-ROM), a Digital Versatile Disc (DVD), magnetic-optic media (e.g., a floptical disk)), an internal memory, or the like. The instruction may include a code created by a compiler or a code executable by an interpreter. The module or programming module according to various exemplary embodiments may further include at least one or more constitutional elements among the aforementioned constitutional elements, or may omit some of them, or may further include additional other constitutional elements. According to various exemplary embodiments, operations performed by a module, programming module, or other constitutional elements may be executed in a sequential, parallel, repetitive, or heuristic manner. At least some of the operations may be executed in a different order or may be omitted, or other operations may be added.

In the aforementioned specific embodiments of the disclosure, a component included in the disclosure is expressed in a singular or plural form according to the specific example embodiment proposed herein. However, the singular or plural expression is selected properly for a situation proposed for the convenience of explanation, and thus the various embodiments of the disclosure are not limited to a single or a plurality of components. Therefore, a component expressed in a plural form can also be expressed in a singular form, or vice versa.

While the disclosure has been shown and described with reference to certain preferred embodiments thereof, it will be understood by those skilled in the art that various changes in form and details may be made therein without departing from the spirit and scope of the disclosure as defined by the appended claims. Therefore, the scope of the disclosure is defined not by the detailed description thereof but by the appended claims, and all differences within equivalents of the scope will be construed as being included in the disclosure.

What is claimed is:

1. An electronic device comprising:
   a communication module;
   a memory storing instructions; and
   at least one processor,
   wherein the at least one processor is configured to:
      receive a ruleset including information regarding at least one action performed by the electronic device and at least one condition for triggering the at least one action from another electronic device via the communication module;
      execute the stored instructions to perform a function of the electronic device corresponding to the ruleset; and
      detect a user's input to verify completion of an act indicated by an action included in the ruleset,
   wherein the at least one action includes a specific function of a specific application stored in the memory and executed by the at least one processor and data based on the specific function of the specific application,
   wherein the ruleset includes at least one ruleset of which a permission for at least one of reading, modification, and deletion is limited, and
   wherein the ruleset includes information regarding a plurality of actions executed each sequentially by a plurality of devices different from one another.

2. The electronic device of claim 1,
   wherein the ruleset includes a first action designating execution of the specific function and a trigger used as an execution condition of the first action, and
   wherein the first action is defined as an execution condition of a second action.

3. The electronic device of claim 1,
   wherein the ruleset includes a first sub-ruleset and a second sub-ruleset, and
   wherein the first sub-ruleset is defined as an execution condition of the second sub-ruleset.

4. The electronic device of claim 1, wherein the at least one processor is configured to:
   transmit a first message requesting a change of the permission in response to a user's input instructing a process corresponding to the limited permission;
   receive a second message approving the change of the permission; and
   execute the stored instructions to perform the process instructed by the user's input in response to the change of the permission approved by the second message.

5. The electronic device of claim 4, wherein the change of the permission includes a limited duration of validity.

6. The electronic device of claim 1, wherein the at least one processor is further configured to execute the stored instructions to transmit information regarding the plurality of devices to a server managing the ruleset.

7. An electronic device comprising:
   a communication module;
   a memory storing instructions; and
   at least one processor configured to:
      transmit a ruleset including information regarding at least one action performed by the electronic device and at least one condition for triggering the at least one action to a first electronic device via the communication module, wherein the at least one action includes specific function of a specific application stored in the memory and executed by the at least one processor and data based on the specific function of the specific application, wherein the ruleset includes at least one ruleset of which a permission for at least one of reading, modification, and deletion is limited, and wherein the ruleset includes information regarding a plurality of actions executed each sequentially by a plurality of devices different from one another; and
      detect a user's input to verify completion of an act indicated by an action included in the ruleset.

8. The electronic device of claim 7, wherein the at least one processor is further configured to execute the stored instructions to receive the ruleset from a second electronic device which has generated the ruleset via the communication module.

9. The electronic device of claim 8, wherein the at least one processor is configured to:
   receive a first message which requests for a change of the permission from the first electronic device;
   transmit a second message which inquires whether the change of the permission is accepted to the second electronic device;
   receive a third message which reports whether the change of the permission is accepted from the second electronic device; and
   execute the stored instructions to transmit a fourth message which reports whether the permission is changed to the first electronic device.

10. The electronic device of claim 7,
    wherein the at least one processor is configured to execute the stored instructions to receive information regarding the plurality of devices.

11. The electronic device of claim 10, wherein the at least one processor is configured to:
    control a first device to perform a first action based on the ruleset;
    identify a second device corresponding to a second action which uses the first action as an execution condition; and
    execute the stored instructions to control the second device to perform the second action in response to the second device being identified.

12. The electronic device of claim 11, wherein the at least one processor is configured to:
    skip the second action in response to an absence of the second device; and
    execute the stored instructions to control a third device, which is predetermined to execute a third action, to execute the third action if the second action is a condition for executing the third action.

13. The electronic device of claim 7, wherein the at least one processor is configured to execute the stored instructions to transmit the ruleset to a server which manages the ruleset.

14. The electronic device of claim 13, wherein the at least one processor is configured to:
receive, from the server, a first message which inquires whether a change of the permission is accepted; and
transmit, to the server, a second message which reports whether the change of the permission is accepted.

15. An operation method of an electronic device, comprising:
receiving a ruleset including information regarding at least one action performed by the electronic device and at least one condition for triggering the at least one action from another electronic device via a communication module;
executing stored instructions to perform a function of the electronic device corresponding to the ruleset, wherein the at least one action includes specific function of a specific application stored in a memory and executed by at least one processor and data based on the specific function of the specific application, and wherein the ruleset includes at least one ruleset of which a permission for at least one of reading, modification, and deletion is limited;
transmitting information regarding a plurality of actions executed each sequentially by a plurality of devices included in the ruleset; and
detecting a user's input to which the electronic device verifies completion of an act indicated by an action included in the ruleset.

16. The operation method of claim 15, further comprising:
transmitting a first message requesting a change of the permission in response to a user's input instructing a process corresponding to the limited permission;
receiving a second message approving a change of the permission; and
executing the stored instructions to perform the process instructed by the user's input in response to the change of the permission approved by the second message.

17. The operation method of claim 16, further comprising:
displaying at least one objects notifying of the change of the permission.

18. The operation method of claim 15, further comprising:
transmitting, in response to the detection of the user's input, a message notifying the completion of the act.

* * * * *